(12) United States Patent
Davies et al.

(10) Patent No.: US 12,367,858 B2
(45) Date of Patent: *Jul. 22, 2025

(54) SYSTEMS AND METHODS FOR A TEXT-TO-SPEECH INTERFACE

(71) Applicant: Google LLC, Mountain View, CA (US)

(72) Inventors: Benedict Davies, London (GB); Guillaume Boniface, London (GB); Jack Whyte, London (GB); Jakub Adamek, St. Albans (GB); Simon Tokumine, London (GB); Alessio Macri, London (GB); Matthias Quasthoff, London (GB)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/665,861

(22) Filed: May 16, 2024

(65) Prior Publication Data

US 2024/0304173 A1    Sep. 12, 2024

Related U.S. Application Data

(63) Continuation of application No. 17/487,114, filed on Sep. 28, 2021, now Pat. No. 12,020,681, which is a
(Continued)

(51) Int. Cl.
 *G10L 13/00* (2006.01)
 *G06F 3/16* (2006.01)
 *G06F 40/30* (2020.01)

(52) U.S. Cl.
 CPC .............. *G10L 13/00* (2013.01); *G06F 3/167* (2013.01); *G06F 40/30* (2020.01)

(58) Field of Classification Search
 None
 See application file for complete search history.

(56) References Cited

U.S. PATENT DOCUMENTS 5,500,919 A    5/1996 Luther
5,857,099 A    1/1999 Mitchell et al.
(Continued)

FOREIGN PATENT DOCUMENTS

WO    WO 2015043442    4/2015

OTHER PUBLICATIONS

Inrernational Search Report and Written Opinion for Application No. PCT/US2018/053579, mailed on Apr. 16, 2019, 11 pages.

*Primary Examiner* — Satwant K Singh
(74) *Attorney, Agent, or Firm* — DORITY & MANNING, P.A.

(57) ABSTRACT

A computing system and related techniques for selecting content to be automatically converted to speech and provided as an audio signal are provided. A text-to-speech request associated with a first document can be received that includes data associated with a playback position of a selector associated with a text-to-speech interface overlaid on the first document. First content associated with the first document can be determined based at least in part on the playback position, the first content including content that is displayed in the user interface at the playback position. The first document can be analyzed to identify one or more structural features associated with the first content. Speech data can be generated based on the first content and the one or more structural features.

20 Claims, 26 Drawing Sheets

Related U.S. Application Data continuation of application No. 16/418,492, filed on May 21, 2019, now Pat. No. 11,145,288.

(60) Provisional application No. 62/702,729, filed on Jul. 24, 2018.

(56) References Cited

U.S. PATENT DOCUMENTS

| | | |
|---|---|---|
| 6,961,700 B2 | 11/2005 | Mitchell et al. |
| 8,145,497 B2 | 3/2012 | Ahn et al. |
| 8,805,692 B2 * | 8/2014 | Goldstein ................ H04R 3/00 704/275 |
| 9,672,337 B2 | 6/2017 | Nyshadham et al. |
| 10,236,011 B2 * | 3/2019 | Goldstein ................ G10L 13/00 |
| 10,297,265 B2 * | 5/2019 | Goldstein ................ G10L 25/48 |
| 10,311,887 B2 * | 6/2019 | Goldstein ................ H04R 3/00 |
| 10,410,649 B2 * | 9/2019 | Goldstein ................ H04R 3/00 |
| 10,586,535 B2 | 3/2020 | Kudurshian et al. |
| 10,733,993 B2 | 8/2020 | Kudurshian et al. |
| 10,839,804 B2 | 11/2020 | Kudurshian et al. |
| 11,037,565 B2 | 6/2021 | Kudurshian et al. |
| 11,145,288 B2 * | 10/2021 | Davies .................... G06F 3/167 |
| 11,657,820 B2 | 5/2023 | Kudurshian et al. |
| 11,662,895 B2 | 5/2023 | Fettes et al. |
| 12,020,681 B2 * | 6/2024 | Davies .................... G06F 3/167 |
| 2008/0071529 A1 | 3/2008 | Silverman et al. |
| 2009/0204402 A1 | 8/2009 | Marwaha et al. |
| 2009/0254345 A1 | 8/2009 | Fleizach et al. |
| 2015/0279347 A1 | 10/2015 | Byron et al. |

* cited by examiner

SYSTEMS AND METHODS FOR A TEXT-TO-SPEECH INTERFACE

PRIORITY CLAIM

The present application is continuation of U.S. patent application Ser. No. 17/487,114 having a filing date of Sep. 28, 2021, entitled "Systems and Methods for a Text-to-Speech Interface," which is a continuation of U.S. patent application Ser. No. 16/418,492 having a filing date of May 21, 2019, entitled "Systems and Methods for a Text-to-Speech Interface," which claims the benefit of priority of U.S. Provisional Patent Application No. 62/702,729 filed Jul. 24, 2018, entitled "Systems and Methods for a Text-to-Speech Interface," and PCT Patent Application PCT/US2018/053579 filed Sep. 28, 2018, entitled "Systems and Methods for a Text-to-Speech Interface." The above-referenced patent applications are hereby incorporated by reference herein in its entirety for all purposes.

FIELD

The present disclosure relates to converting text to speech, and more particularly to computer-implemented techniques for identifying content to be converted to speech in association with a text-to-speech service.

BACKGROUND

A user can interact with content that is being displayed by a computing system to the user in many different ways. For example, the user can interact with the content visually to read text associated with the content, or the user can interact with the content via a text-to-speech interface of a text-to-speech system such that text associated with the content is read aloud to the user.

SUMMARY

Aspects and advantages of the present disclosure will be set forth in part in the following description, or may be learned from the description, or may be learned through practice of the embodiments.

One example aspect of the present disclosure is directed to a computer-implemented method for selecting content to be read aloud. The method includes receiving a text-to-speech request associated with a first document, the request including data associated with a playback position of a selector associated with a text-to-speech interface overlaid on the first document. In some examples, the playback position may correspond to a location of a selector that can be placed by a user at a desired location for playback of text as speech. The method includes determining first content associated with the first document based at least in part on the playback position, the first content including content that is displayed in the user interface at the playback position. The method includes analyzing the first document to identify one or more structural features associated with the first content. The method includes generating speech data based on the first content and the one or more structural features.

Another example aspect of the present disclosure is directed to a computing system. The computing system includes one or more processors and one or more tangible, non-transitory, computer readable media that collectively store instructions that when executed by the one or more processors cause the computing system to perform operations. The operations include receiving a text-to-speech request associated with a first document, the request including data associated with a playback position of a selector associated with a text-to-speech interface overlaid on the first document. The operations include determining first content from the first document based at least in part on the playback position, the first content including content that is displayed in the user interface at the playback position. The operations include analyzing the first document to identify one or more structural features associated with the first content. The operations include generating speech data based on the first content and the one or more structural features.

Yet another example aspect of the present disclosure is directed to one or more tangible non-transitory computer-readable media storing computer-readable instructions that when executed by one or more processors cause the one or more processors to perform operations. The operations include receiving a text-to-speech request associated with a first document, the request including data associated with a playback position of a selector associated with a text-to-speech interface overlaid on the first document. The operations include determining first content from the first document based at least in part on the playback position, the first content including content that is displayed in the user interface at the playback position. The operations include analyzing the first document to identify one or more structural features associated with the first content. The operations include generating speech data based on the first content and the one or more structural features.

Other example aspects of the present disclosure are directed to systems, methods, vehicles, apparatuses, tangible, non-transitory computer-readable media, and memory devices for providing a text-to-speech service.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
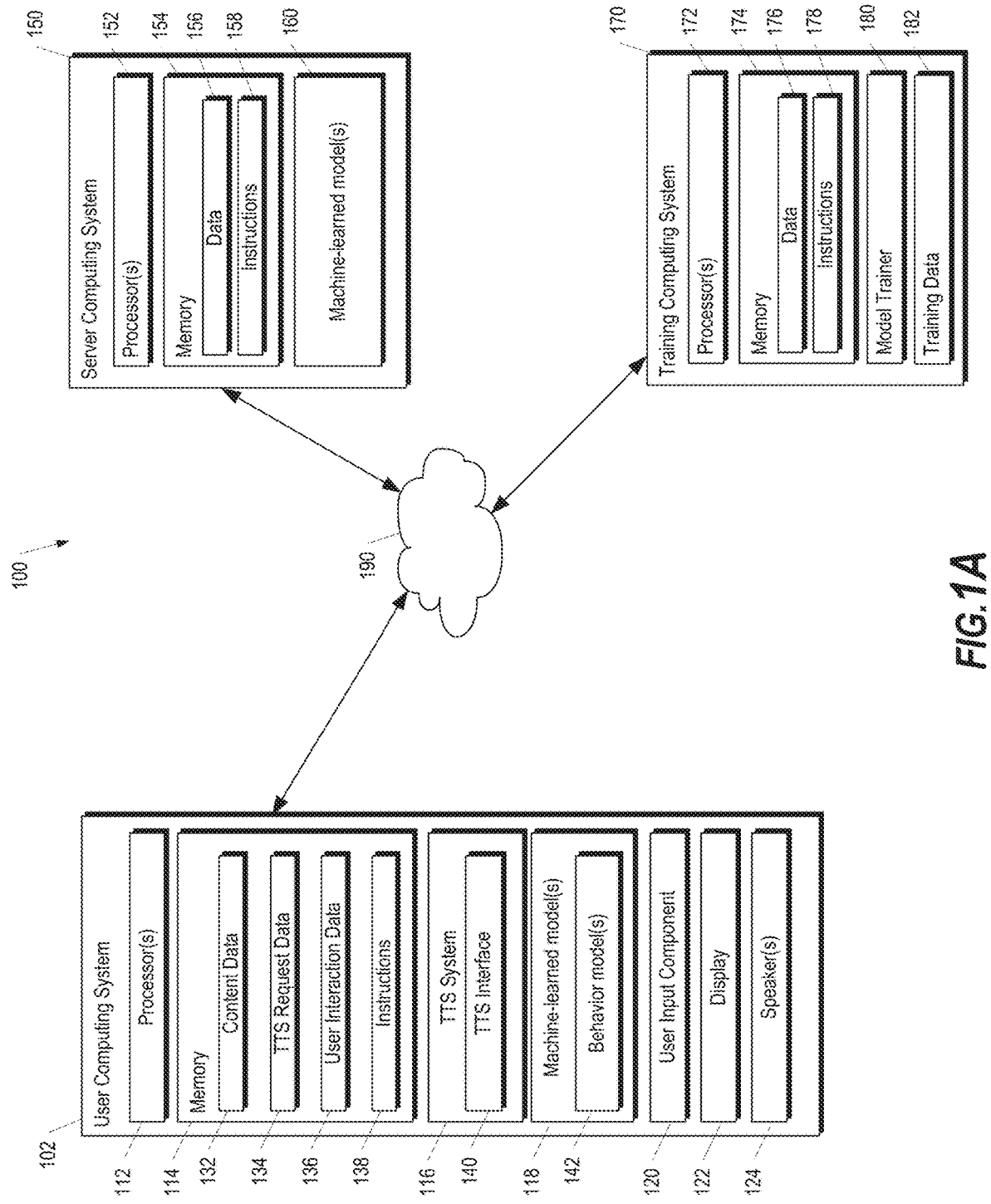
FIG. 1A depicts a block diagram of an example computing environment according to example embodiments of the present disclosure.

Reference numerals that are repeated across plural figures are intended to identify the same components or features in various implementations.

DETAILED DESCRIPTION

Example aspects of the present disclosure are directed to methods and systems for interacting with content provided in association with computing devices, such as content displayed in a graphical user interface. In particular, a text-to-speech (TTS) system can provide a TTS service that can allow for the automatic conversion of a text displayed in a graphical user interface to an audio output, such that a user can have textual content, and in some embodiments additional information, read aloud to facilitate understanding the content. The TTS system can include a TTS interface comprising a TTS selector that is overlaid on top of a document that is being displayed on a display of one or more computing devices. The user can initiate a TTS request via the TTS interface by moving the TTS selector from a first position (e.g., default position) associated with the TTS interface to a second position associated with the TTS interface overlaid on the document. The second position can correspond to or otherwise indicate a playback position (such as a selected portion) on the document. The TTS system can determine first content from the document based on the playback position, and determine one or more structural features associated with the first content. In some example, the TTS system can determine second content elsewhere in the document that relates to the first content (e.g., structurally related, semantically related, etc.), second content that may be relevant to the user based on previous TTS requests received from the user or previous interactions of the user with the document, second content that translates the first content into a different language, etc. The TTS system can generate speech data based on the first content and the one or more structural features. In some examples, the TTS system can generate speech data based on the second content in order to generate an audio output based on the speech data. For example, the TTS may read aloud the first content and the second content to the user. In some implementations, the TTS system can generate speech data based on the first content alone in order to generate the audio output based on the speech data. In this way, the user can more easily understand the content and structure of the document and/or aspects of the document that are most useful or relevant to the user. A document as discussed herein may include any type of electronic content that includes text. It will be appreciated that the TTS system can determine first and second content from documents such as search results, text fields, icons, labels, two or more documents, etc. that include any type of displayed content.

As an example, a computing device may display a page of content such as a webpage, news article, etc. having textual content that a user can request to be provided in an audio format. For example, a user may be unable to read text in a displayed language, may be vision-impaired, or may otherwise wish to have textual data provided as speech in an audio output (e.g., spoken aloud to them). The TTS interface can allow the user to position the TTS selector (e.g., via a mechanism such as drag and drop) at a playback position on the page. As the user moves the TTS selector over the page, individual components of the page (e.g., headline, sub-headline, paragraph, caption, image, video, advertisement, etc.) can be highlighted to indicate to the user that the text associated with the component can be interpreted and rendered as speech in audio output provided by the TTS system. If the user releases the TTS selector at a playback position on top of or otherwise corresponding to a specific component of the page, the TTS interface can determine first content associated with the component. The TTS system may identify one or more structural features of the page. The TTS system can identify the first content based at least in part on the one or more structural features. Additionally, the TTS system can determine second content from the page based at least in part on the first content. The second content can be identified based on the one or more structural features of the page such that the TTS system can automatically identify related content to provide a more accurate rendering of audio content intended to be selected by a user. As a specific example, the TTS system can identify a cohesive grouping of text, such as a sentence, paragraph, article, etc., for conversion to audio based on user input indicative of a portion of the grouping of text. The TTS system can commence playback of the first and second content to the user as an audio output.

As another example, if a user releases the TTS selector at a position that is not associated with a component of the page that can be interpreted by the TTS system, then the TTS system can ignore the TTS request from the user and take no action. Alternatively, the TTS system can playback an explanatory or educational message (potentially accompanied by a matching animation or illustration) to explain which aspects of the page the TTS system is capable of interpreting.

As another example, at any time during playback of the first and second content, the TTS system can provide the user with options to control the playback via the TTS interface. The TTS system can allow the user to stop, pause, rewind, fast-forward, or skip to a previous or next section of the playback.

According to aspects of the present disclosure, the TTS system can receive a TTS request associated with a first document. The TTS system can receive the TTS request from a user interacting with the TTS interface. The TTS request can include data associated with a playback position of the TTS selector associated with the TTS interface. The TTS system can determine first content from the first document based on the playback position of the TTS selector.

In some implementations, the first document can include an organizational hierarchy. The top level of the organizational hierarchy can include the first document as a whole, and each successive level of the organizational hierarchy can include one or more components (e.g., headline, sub-headline, paragraph, sentence, caption, image, video, advertisement, etc.), each component being associated with content from the first document. The organizational hierarchy of the first document can be determined from structural features of the first document in example embodiments.

As an example, a first level of the first document can include a headline, a second level can include a sub-headline, and a third level can include one or more paragraphs. The headline, sub-headline, and one or more paragraphs can each be associated with textual content.

As another example, a first level of the document can include a first headline, a second headline, and one or more first paragraphs. A second level of the document can include a first sub-headline associated with the first headline, and one or more second paragraphs associated with the second headline. A third level of the document can include one or more third paragraphs associated with the first sub-headline.

While the first level has been illustrated above as being a headline, the first level may alternatively be some other component of the document, with second etc. levels working from there though one or more subsidiary levels through the hierarchy of components.

In some implementations, the TTS system can determine the first content based on content that is displayed at the playback position (e.g., the center of an icon moved over the content by user action). In particular, the TTS selector can be associated with a selection area centered on the playback position of the TTS selector, and the TTS system can determine the first content as content that is displayed at least in part within the selection area at the playback position.

As an example, if the selection area at playback position of the TTS selector includes a headline of the first document, then the TTS system can determine the first content as the content associated with the headline. Similarly, if the selection area at the playback position of the TTS selector includes a sub-headline, paragraph, sentence, caption, image, video, advertisement, or other component of the first document, then the TTS system can determine the first content as the content associated with the paragraph, sentence, caption, image, video, advertisement, or other component, respectively. The TTS system can determine the first content based at least in part on one or more structural features in example embodiments.

As another example, if the selection area at the playback position of the TTS selector includes two or more components of the first document (e.g., a headline and a sub-headline), then the TTS system can determine a component from the two or more components that occupies a greater portion of the selection area and determine the first content as the content associated with the determined component.

In some implementations, the TTS system can analyze one or more characteristics associated with the TTS request to determine movement data indicative of a movement of the TTS selector from a first position in the TTS interface to the playback position. The first position can be a default or docked position of the TTS selector in the TTS interface where the TTS selector is displayed. The first position may be a last position of the display at which the TTS selector was positioned by a user. The TTS selector can be displayed overlaid on top of the first document, or elsewhere on a display that displays the first document. The first position of the TTS selector can be adjusted (e.g., by the user, or automatically) in relation to the first document so that the content of the first document is visible on the display (e.g., so that the TTS selector overlaid on the first document does not cover or block visibility of content that is of interest). The TTS system can determine the first content from the first document based on the movement data.

As an example, the TTS system can determine movement data indicative of a movement speed of the TTS selector from the first position to the playback position. If the movement speed is above a first threshold speed and below a second threshold speed, then the TTS system can associate a default selection area with the TTS selector and the TTS system can determine the first content based on the default selection area at the playback position. If the movement speed is above the second threshold speed, then the TTS selector can be associated with an expanded selection area and the TTS system can determine the first content based on the expanded selection area at the playback position. If the movement speed is below the first threshold speed, then the TTS selector can be associated with a reduced selection area and the TTS system can determine the first content based on the reduced selection area at the playback position. In this way, the TTS system can include a plurality of threshold speeds that are each associated with an incremental expansion or reduction of the selection area at the playback position. Any number of threshold speeds may be used to determine a selection area in relation to a movement speed.

As another example, the TTS system can determine movement data indicative of a movement path of the TTS selector from the first position to the playback position. If the movement path is a substantially direct path from the first position to the playback position, then the TTS selector can be associated with a default selection area and the TTS system can determine the first content based on the default selection area at the playback position. If the movement path includes a deviation from the direct path between the first position and the playback position, then the TTS selector can be associated with an expanded selection area and the TTS system can determine the first content based on the expanded selection area at the playback position. The TTS system can determine the expanded selection area based on, for example, an amount or distance of the deviation in the movement path with respect to the direct path. Various numbers and types of deviations may be analyzed to determine a selection area in relation to a movement path of the TTS selector.

As another example, the TTS system can determine a delay between a first time when the TTS selector is moved to the playback position and a second time when the TTS selector is released at the playback position. If the delay is below a first threshold amount, then the TTS selector can be associated with a default selection area and the TTS system can determine the first content based on the default selection area at the playback position. If the delay is above the first threshold amount, then the TTS selector can be associated with a reduced selection area and the TTS system can determine the first content based on the reduced selection area at the playback position. Alternatively, if the delay is above the first threshold amount, then the TTS selector can be associated with an expanded selection area and the TTS system can determine the first content based on the expanded selection area at the playback position. In this way, the TTS system can include a plurality of threshold delay amounts that are each associated with an incremental expansion or reduction of the selection area at the playback position. Any number of threshold delays may be used to determine a selection area in relation to a movement and selection.

According to aspects of the present disclosure, the TTS system can determine second content from the first document.

In some implementations, the TTS system can analyze the first document to identify one or more structural features associated with the first content. The TTS system can analyze one or more contents of the first document to identify the structural features(s) associated with the first content. The structural feature(s) can include, for example, a component of the organizational hierarchy of the first document that is associated with the first content, or metadata associated with the first content. The TTS system can determine the second content from the first document based on the structural features associated with the first content. The structural features can be determined from an analysis of a hyper-text markup language (HTML) document of a web page for example. Tags or elements delineating or otherwise defining a structure of the web page can be analyzed to identify structural features. Structural features such as content grouping can be identified from an analysis of one or more tags that group the content together. Tags and/or other elements can be used to identify structural features such as paragraphs, breaks, sections, or other features. In other examples, other types of elements associated with text within a document may be analyzed.

As an example, if the first content is associated with a first headline of the first document, then the TTS system can determine the second content as content associated with a second headline of the first document. If the first content is associated with a first paragraph of the first document, then the TTS system can determine the second content as content associated with a second paragraph of the first document. If the first content is associated with a first sentence of the first document, then the TTS system can determine the second content as content associated with a second sentence of the first document.

In some implementations, the second content can include contextual information based on the one or more structural features associated with the first content.

As an example, as the user moves the TTS selector over the page, individual components of the page can be highlighted to indicate to the user that the text associated with the component can be interpreted and rendered as speech in audio output provided by the TTS system. If text associated with a first component of the first document (e.g., "abc") is highlighted when the user releases the TTS selector, then the TTS system can determine the first content as the highlighted text and determine the second content to indicate that the first content is the highlighted text (e.g., "the highlighted text reads"). The TTS system can generate speech data based on the first content and second content (e.g., "the highlighted text reads abc").

As another example, if the first content is text associated with a heading of the first document (e.g., "world news"), then the TTS system can determine the second content to indicate that the first content is associated with the heading (e.g., "the heading reads"). The TTS system can generate speech data based on the first content and the second content (e.g., "the heading reads world news").

As another example, if a first portion of content inside the selection area is undecipherable, but the TTS system can recognize a second portion (e.g., "abc") of content inside the selection area, then the TTS system can determine the first content as the second portion and determine the second content to indicate that the first content is associated with the recognized content (e.g., "part of the text is undecipherable, but the recognized portion reads"). The TTS system can generate speech data based on the first content and the second content (e.g., "part of the text is undecipherable, but the recognized portion reads abc").

As another example, if the TTS system determines first content that includes an embedded image (e.g., picture, emoji, etc.), then the TTS system can determine the second content based on metadata associated with the embedded image. The TTS system can generate speech data based on the first content and the second content (e.g., "she opened the door with a look of (surprised-face emoji)").

In some implementations, the TTS system can determine one or more semantic attributes associated with the first content. The TTS system can determine the second content from the first document based on a semantic relationship between the second content and the first content.

As an example, if the first content includes a reference to an image or video elsewhere in the first document, then the TTS system can determine the second content as content associated with a caption of image or video. If the first content includes a mention of a term or phrase introduced elsewhere in the first document, then the TTS system can determine the second content as content associated with an introduction or explanation of the term or phrase. If the first content includes a link to a second document, then the TTS system can determine the second content as content associated with the second document (e.g., a title, summary, or description of the second document).

In some implementations, the TTS system can determine the second content based on the movement data indicative of the movement of the TTS selector from a first position in the TTS interface to the playback position.

As an example, the TTS system can determine movement data indicative of a movement speed of the TTS selector from the first position to the playback position. If the movement speed is below a first threshold speed and the TTS selector is associated with a reduced selection area, then the TTS system can determine the second content as content associated with a default selection area at the playback position. If the movement speed is above a second threshold speed and the TTS selector is associated with an expanded selection area that includes two or more components of the first document, then the TTS system can determine a component from the two or more components that occupies a lesser portion of the selection area and determine the second content as the content associated with the determined component.

As another example, the TTS system can determine movement data indicative of a movement path of the TTS selector from the first position to the playback position. If the movement path of the TTS selector includes a first component of the first document, and the selection area at the playback position includes a second component of the first document, then the TTS system can determine the first content as content associated with the second component and the second content as content associated with the first component.

In some implementations, the TTS system can determine the second content based on one or more previous TTS requests received from the user. The previous TTS request(s) can be associated with the first document.

As an example, if the TTS system determines that first content associated with a current TTS request is also associated with one or more previous TTS requests, then the TTS system can determine that the user is having difficulty understanding the first content. The TTS system can determine second content associated with the current TTS requests that can further assist the user in understanding the first content.

In some implementations, the TTS system can determine the second content based on a previous behavior (e.g., one or more previous interactions) of the user with the first document and/or other documents. The second content can be based on user behavior represented in a behavior model generated over one or more sessions with the first and/or other documents.

As an example, if the user scrolls quickly to a first component of the first document associated with a current TTS request, then the TTS system can determine that the user is interested in content associated with the first component and the TTS system can determine second content that is associated with the first component. For example, the TTS system may determine that the user intended to select a paragraph or article in response to a fast movement speed to a playback position. The first content can be the content directly associated with the playback position and the second content can be the remaining content of the article or paragraph that the TTS system determines was the intended selection. If the user scrolls through the first document slowly until the user reaches the first component that is associated with the current TTS request, then the TTS system can determine that the user is interested in content more directly associated with a selected playback position. For example, in response to a slow movement to a point within an article, the TTS system may determine that the user intended to select a particular sentence within the article for playback. The first content can be the content directly associated with the playback position and the second content can be the remaining content of the sentence that the TTS systems determines was the intended selection.

As another example, the TTS system can use machine learning techniques to determine the first and second content to generate speech data in response to a first TTS request associated with a first component of the first document. If the user then scrolls to another component of the first document after listening to the speech data, then the TTS system can determine that the determined first and second content was satisfactory for the user. If the TTS system receives a second TTS request associated with the first component of the first document at a later time, then the TTS system can determine the same first and second content to generate speech data in response to the second TTS request. Alternatively, if the user does not scroll to another component of the first document after listening to the speech data, then the TTS system can determine that the determined first and second content was not satisfactory for the user. If the TTS system receives a second TTS request associated with the first component of the first document at a later time, then the TTS system can determine second content associated with the second TTS request that can further assist the user in understanding the first content.

As another example, the TTS system can input data indicative of first content associated with a current TTS request into the behavior model and the TTS system can obtain, as an output of the behavior model, a prediction of second content that the user may be interested in based on the input. The TTS system can determine the second content based on the prediction of the behavior model. The behavior model can be a machine-learned model that is trained with data indicative of the user's past behavior generated over one or more sessions with the first and/or other documents.

In some implementations, the TTS system can use a plurality of playback voices to playback the first and second content. The TTS system can use one or more machine-learned models to identify parts of the first and second content that can be associated with one or more different playback voices. As an example, if the TTS system determines first and second content that includes a dialog between two or more people, then the TTS system can commence playback of the content to the user as an audio output by using two or more playback voices. The TTS system can associate each of the two or more playback voices to a different person in the dialog. As another example, if the TTS system determines first and second content that includes a pull-quote, then the TTS system can commence playback of the content to the user as an audio output by using a different playback voice for the pull-quote with respect to the remainder of the content.

The systems and methods described herein can provide a number of technical effects and benefits. For example, by enabling a TTS system that can determine first content and second content from a document in response to a TTS request and automatically convert text associated with the first and second content to an audio output, the systems and methods of the present disclosure can playback the content for a user to facilitate understanding of the content. In particular, the TTS system can automatically determine the first and second content based on the user's interaction with the TTS interface that displays the document, the user's previous TTS requests with respect to the document, and/or the user's previous behavior over one or more sessions with one or more documents. In this way, the TTS system can enable more precise determination of the first and second content. Additionally, by analyzing structural features associated with the first content and determining the second content based at least in part on the structural features, the systems and methods of the present disclosure can enable the automatic determination of cohesive first and second content for the user. These and other aspects of the present disclosure can enable more efficient use of computing resources, such as reducing server processor and memory usage, reducing on-device processor and memory use, reducing screen use (reduced page loads), reducing bandwidth demand for wireless and/or WiFi networks (and wired connections), etc., by more accurately and precisely determining the content that can assist the user's understanding.

In some implementations, in order to obtain the benefits of the techniques described herein, the user may be required to allow the collection and analysis of information associated with the user or her device. For example, in some implementations, users may be provided with an opportunity to control whether programs or features collect such information. If the user does not allow collection and use of such signals, then the user may not receive the benefits of the techniques described herein. The user can also be provided with tools to revoke or modify consent. In addition, certain information or data can be treated in one or more ways before it is stored or used, so that personally identifiable information is removed. As an example, a computing system can obtain document interaction data which can indicate a user behavior associated with the document, without identifying any particular user(s) or particular user computing device(s).

With reference now to the figures, example embodiments of the present disclosure will be discussed in further detail.

FIG. 1A depicts a block diagram of an example computing environment 100 according to example embodiments of the present disclosure. The environment 100 includes a user computing system 102, a server computing system 150, and a training computing system 170 that are communicatively coupled over a network 190.

User computing system 102 can include one or more computing devices (e.g., computers (e.g., desktop computers, laptop computers, and/or the like) mobile computing devices (e.g., tablet computers, smartphones, and/or the like), wearable computing devices (e.g., smart watches, and/or the like), and/or the like) associated with a common (or the same) user.

System 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store content data 132, TTS request data 134, user interaction data 136, and instructions 138 which are executed by the processor 112 to cause the user computing device 102 to perform operations.

In some implementations, the system 102 can store or include one or more machine-learned models 118. For example, the machine-learned models 118 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more machine-learned models 118 can be received from the server computing system 150 over network 190, stored in the user computing system memory 114, and then used or otherwise implemented by the one or more processors 112. In some implementations, the system 102 can implement multiple parallel instances of a single machine-learned model 118.

Additionally or alternatively, one or more machine-learned models 160 can be included in or otherwise stored and implemented by the server computing system 150 that communicates with the system 102 according to a client-server relationship. For example, the machine-learned models 160 can be implemented by the server computing system 150 as a portion of a web service (e.g., a semantic entity identification service). Thus, one or more models 118 can be stored and implemented at the system 102 and/or one or more models 160 can be stored and implemented at the server computing system 150.

The system 102 can also include one or more user input component 120 that receives user input. For example, the user input component 120 can be a touch-sensitive component (e.g., a touch-sensitive display screen or a touch pad) that is sensitive to the touch of a user input object (e.g., a finger or a stylus). The touch-sensitive component can serve to implement a virtual keyboard and/or implement various touch-based gestures (e.g., drag and drop). Other example user input components include a microphone, a traditional keyboard, or other means by which a user can provide user input.

The server computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the server computing system 150 to perform operations.

In some implementations, the server computing system 150 includes or is otherwise implemented by one or more server computing devices. In instances in which the server computing system 150 includes plural server computing devices, such server computing devices can operate according to sequential computing architectures, parallel computing architectures, or some combination thereof.

As described above, the server computing system 150 can store or otherwise include one or more machine-learned models 160. For example, the models 160 can be or can otherwise include various machine-learned models. Example machine-learned models include neural networks or other multi-layer non-linear models. Example neural networks include feed forward neural networks, deep neural networks, recurrent neural networks, and convolutional neural networks.

The system 102 and/or the server computing system 150 can train the models 118 and/or 160 via interaction with the training computing system 170 that is communicatively coupled over the network 190. The training computing system 170 can be separate from the server computing system 150 or can be a portion of the server computing system 150.

The training computing system 170 includes one or more processors 172 and a memory 174. The one or more processors 172 can be any suitable processing device (e.g., a processor core, a microprocessor, an ASIC, a FPGA, a controller, a microcontroller, etc.) and can be one processor or a plurality of processors that are operatively connected. The memory 174 can include one or more non-transitory computer-readable storage mediums, such as RAM, ROM, EEPROM, EPROM, flash memory devices, magnetic disks, etc., and combinations thereof. The memory 174 can store data 176 and instructions 178 which are executed by the processor 172 to cause the training computing system 170 to perform operations. In some implementations, the training computing system 170 includes or is otherwise implemented by one or more server computing devices.

The training computing system 170 can include a model trainer 180 that trains the machine-learned models 118 and/or 160 stored at the system 102 and/or the server computing system 150 using various training or learning techniques, such as, for example, backwards propagation of errors. In some implementations, performing backwards propagation of errors can include performing truncated backpropagation through time. The model trainer 180 can perform a number of generalization techniques (e.g., weight decays, dropouts, etc.) to improve the generalization capability of the models being trained.

In particular, the model trainer 180 can train the machine-learned models 118 and/or 160 based on a set of training data 182. The training data 182 can include, for example, user feedback or data descriptive of user actions performed in response to various playback experience settings or operations.

In some implementations, if the user has provided consent, the training examples can be provided by the system 102. Thus, in such implementations, the model 118 provided to the system 102 can be trained by the training computing system 170 on user-specific data received from the system 102. In some instances, this process can be referred to as personalizing the model.

The model trainer 180 includes computer logic utilized to provide desired functionality. The model trainer 180 can be implemented in hardware, firmware, and/or software controlling a general purpose processor. For example, in some implementations, the model trainer 180 includes program files stored on a storage device, loaded into a memory and executed by one or more processors. In other implementations, the model trainer 180 includes one or more sets of computer-executable instructions that are stored in a tangible computer-readable storage medium such as RAM hard disk or optical or magnetic media.

The network 190 can be any type of communications network, such as a local area network (e.g., intranet), wide area network (e.g., Internet), or some combination thereof and can include any number of wired or wireless links. In general, communication over the network 190 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the system 102 can include the model trainer 180 and the training dataset 182. In such implementations, the models 118 can be both trained and used locally at the system 102. In some of such implementations, the system 102 can implement the model trainer 180 to personalize the models 118 based on user-specific data.

In some implementations, content data 132 can include data indicative of textual content that a user can request to be provided in an audio format. The textual content in the content data 132 can be associated with one or more documents (e.g., webpages, news articles, lists, etc.). In some implementations, the one or more documents can each be associated with an organizational hierarchy consisting of one or more components (e.g., headline, sub-headline, paragraph, sentence, caption, image, video, advertisement, etc.). The textual content in content data 132 can be associated with the one or more components. Content data 132 can include data indicative of the one or more documents, one or more structural features associated with the one or more documents, an organizational hierarchy associated with each of the one or more documents, and/or an association of the textual content with the one or more components of each organizational hierarchy.

In some implementations, TTS request data 134 can include data indicative of a current TTS request and/or one or more previous TTS requests. Each of the current and/or previous TTS requests can be associated with one or more documents, over one or more sessions. For example, TTS request data 134 can include playback position data, movement data, and/or selection area data associated with each of the current and/or previous TTS requests. The playback position data can indicate a position of a TTS selector on a display in relation to a document. As described further below, the TTS selector can be associated with TTS interface 140 of TTS system 116. The movement data can indicate a movement speed of the TTS selector from a first position to the playback position, a movement path of the TTS selector from the first position to the playback position, and/or a delay between a first time when the TTS selector is moved to the playback position and a second time when the TTS selector is released at the playback position. The selection area data can indicate a size of selection area centered on the playback position.

In some implementations, user interaction data 136 can include data indicative of a user's previous interactions in relation to one or more documents, over one or more sessions. For example, user interaction data 136 can include data indicative of speed at which the user scrolls through a document, an amount of time the user views each component of the document, a frequency at which the user returns to a previous or earlier component of a document, etc. In some implementations, as described further below, user interaction data 136 can be used to generate one or more behavior models 142.

In some implementations, TTS system 116 can receive a TTS request and generate speech data in response to the TTS request. TTS system 116 can be activated or deactivated by a user (e.g., by opening or closing an application corresponding to TTS system 116). When activated, TTS system 116 can include TTS interface 140 comprising a TTS selector that is overlaid on top of a document that is being displayed on display 122 of the computing system 102. A user can initiate a TTS request via TTS interface 140 by moving the TTS selector from a first position (e.g., default or docked position) associated with TTS interface 140 to a second position (e.g., playback position) associated with TTS interface 140 in relation to the document. TTS system 116 can analyze one or more characteristics associated with the TTS request to determine TTS request data 134. TTS system 116 can determine a first content and a second content associated with the document based on content data 132, TTS request data 134, and user interaction data 136. TTS system 116 can generate the speech data based on the first and second content, and playback the speech data via the one or more speakers 124.

In some implementations, machine-learned model(s) 118 can include one or more machine-learned models, such as, for example, one or more behavior models 142. The behavior model(s) 142 can each be associated a user. The behavior model(s) 142 that are associated with a user can be generated based on user interaction data 136 that is indicative of a previous behavior of the user. For example, the behavior model(s) 142 associated with the user can be trained using TTS request data 134 and user interaction data 136 associated with the user, so that the behavior model(s) 142 can predict a future behavior of the user. When TTS system 116 receives a new TTS request from a user in relation to a document, TTS system 116 can input data indicative of the new TTS request into behavior model(s) 142 associated with the user. TTS system 116 can obtain, as an output of behavior model(s) 142, a prediction of second content that the user may be interested in based on the input. In some examples, a behavior model can be specific to a particular user. In other examples, a behavior model may be generalized and represent the aggregated behavior of multiple users.

Figure 1B:
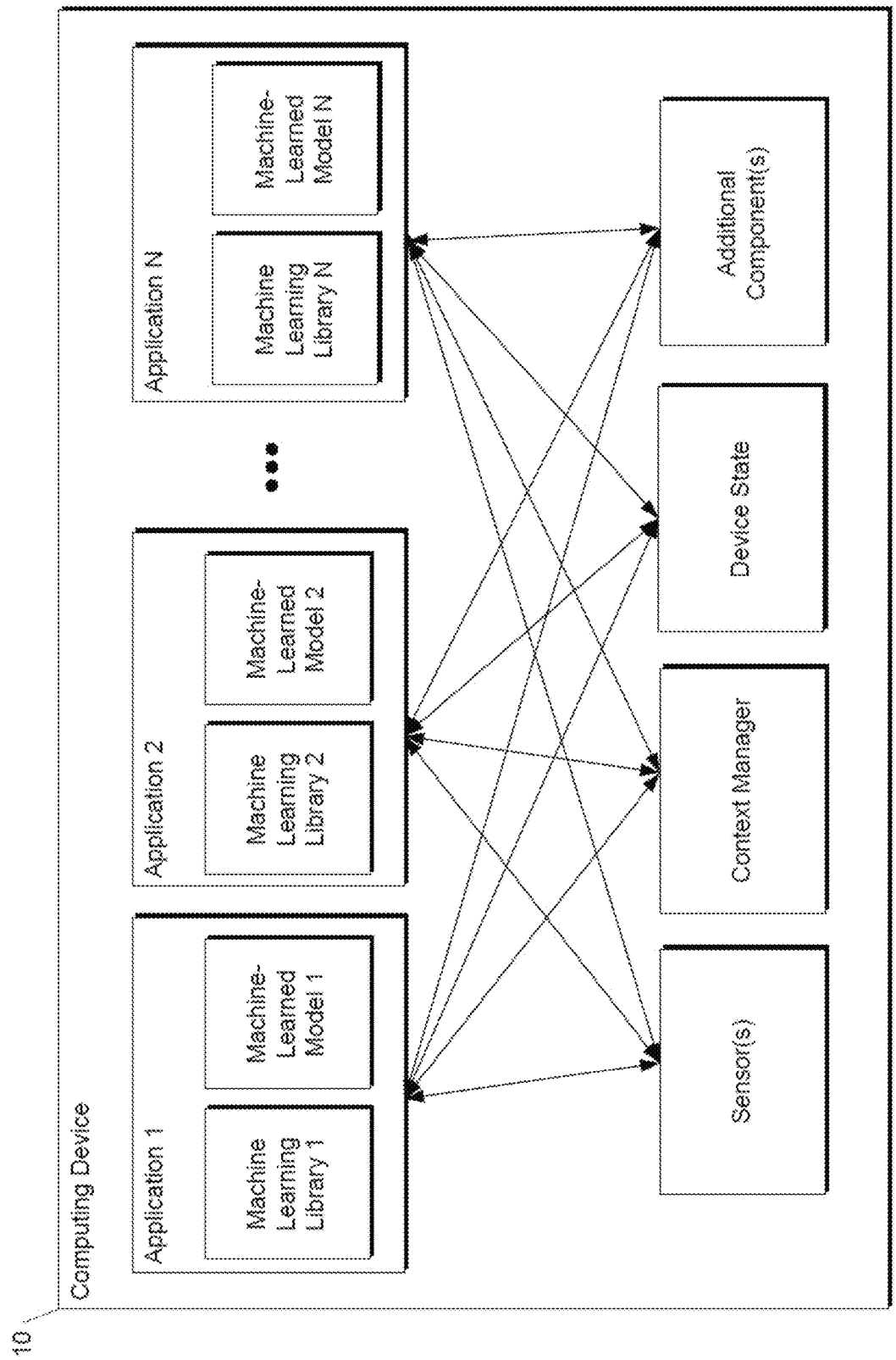
FIG. 1B depicts a block diagram of an example computing device according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
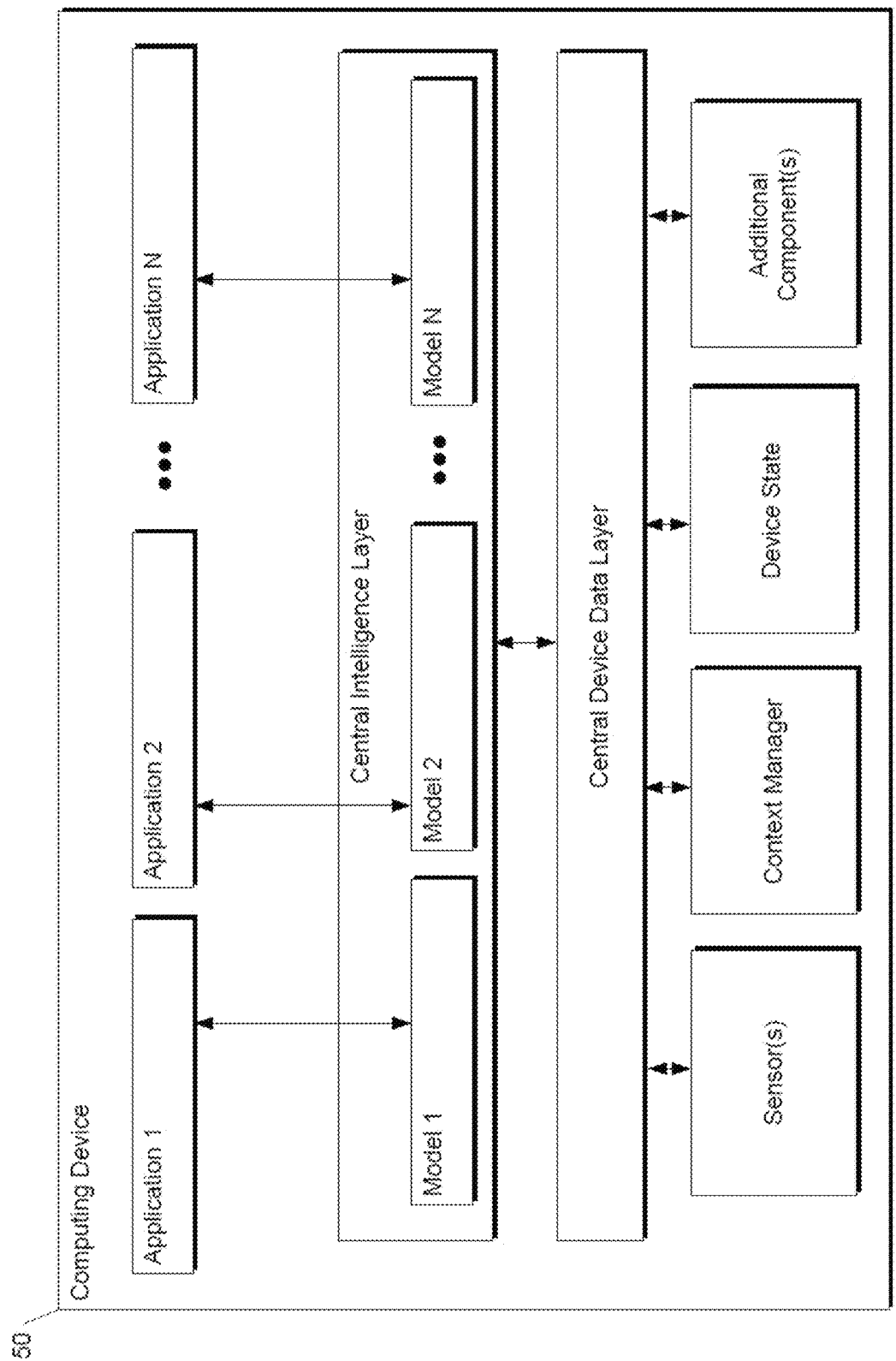
FIG. 1C depicts a block diagram of an example computing device according to example embodiments of the present disclosure.

FIG. 1C depicts a block diagram of an example computing device 50 that performs according to example embodiments of the present disclosure. The computing device 50 can be a user computing system or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example User Interfaces

Figure 2:
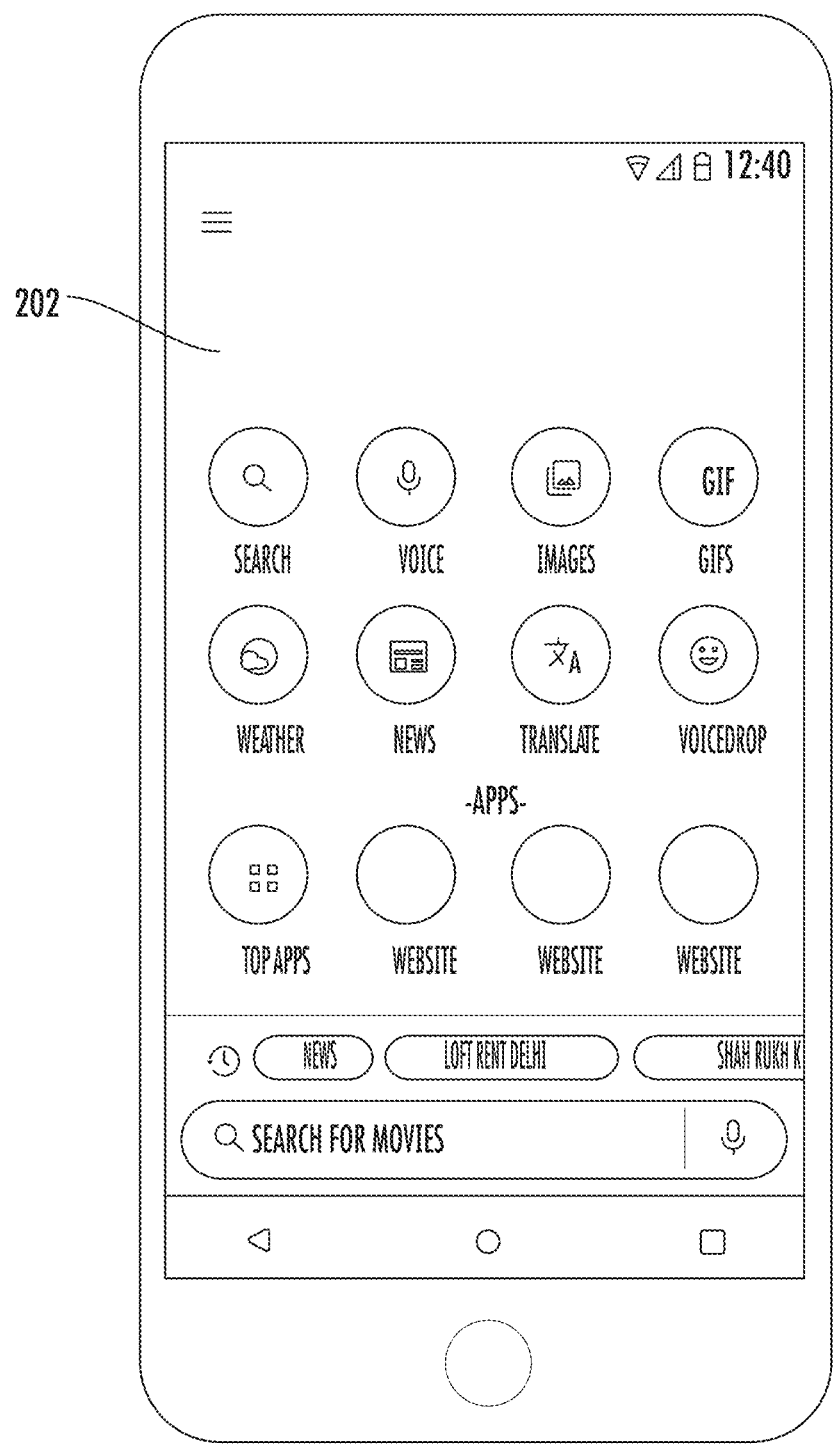
FIG. 2-4 depict an example of activating a TTS system according to example embodiments of the present disclosure.
Figure 3:
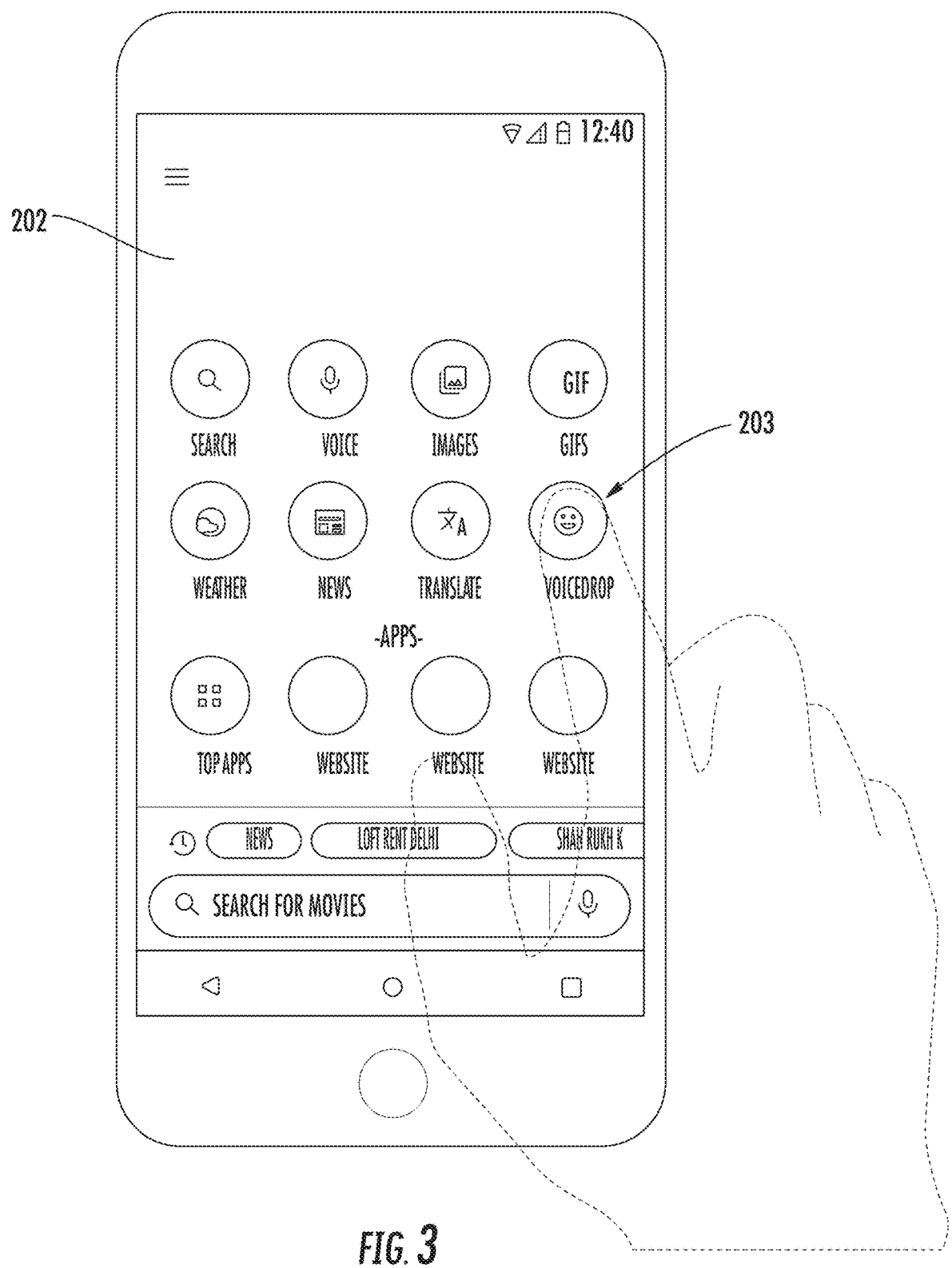
Figure 4:
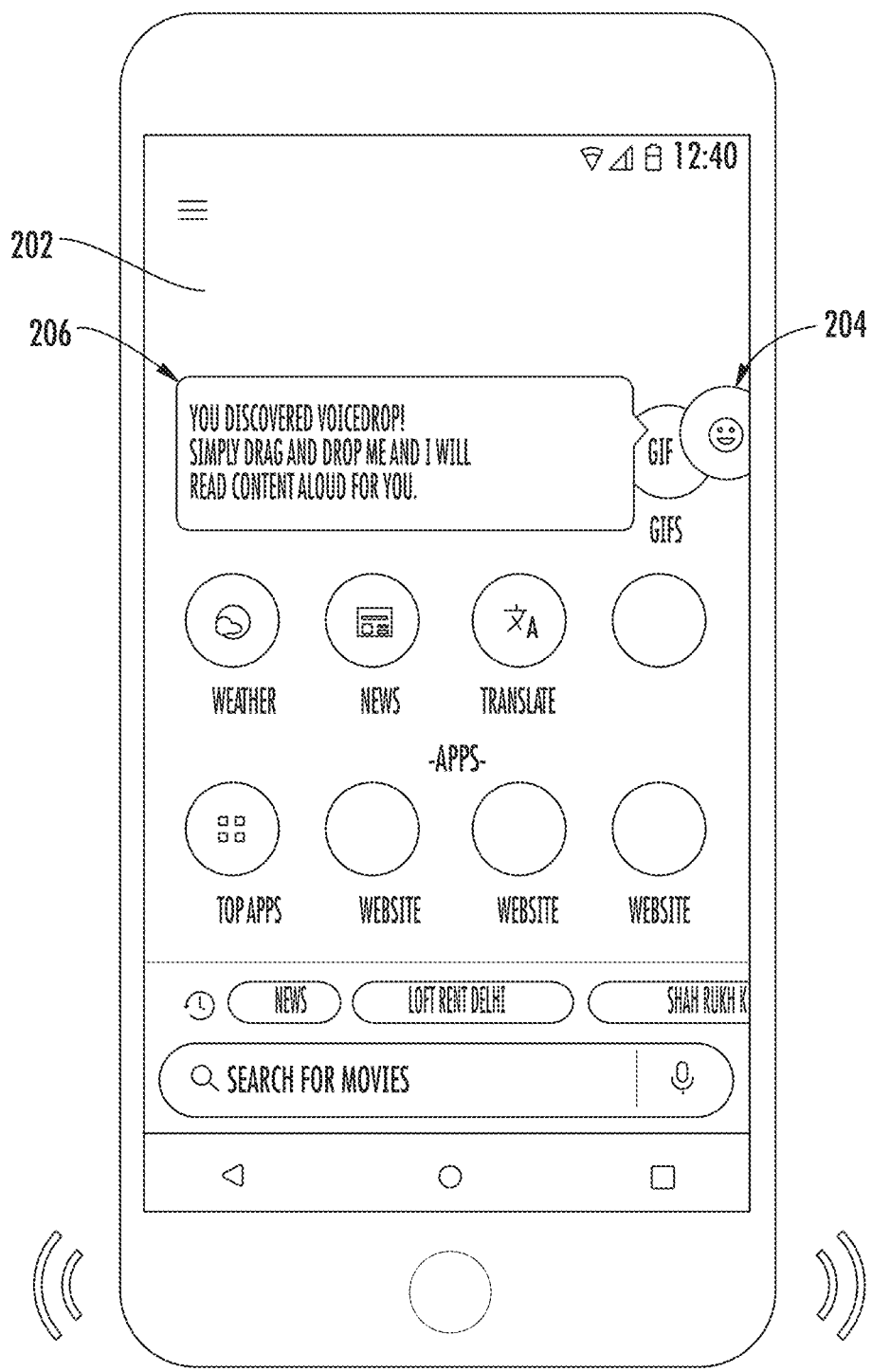

FIG. 2-4 depict an example of activating TTS system 116 according to example embodiments of the present disclosure. As shown in FIG. 2, first document 202 (e.g., a list of apps) can be displayed on display 122. As shown in FIG. 3, a user can select icon 203 associated with the application "Voice Drop" to activate TTS system 116. As shown in FIG. 4, in response to the user selecting icon 203, TTS system 116 can display TTS selector 204 at a first position overlaid on first document 202. TTS selector 204 can be associated with TTS interface 140 of TTS system 116. When TTS system 116 is activated and TTS selector 204 is displayed, TTS system 116 can generate speech data indicative of TTS system 116 being activated and playback an explanatory or educational message 206 for the user (e.g., "You discovered VoiceDrop! Simply drag and drop me and I will read content aloud for you.") via speaker(s) 124 (not shown).

Figure 5:
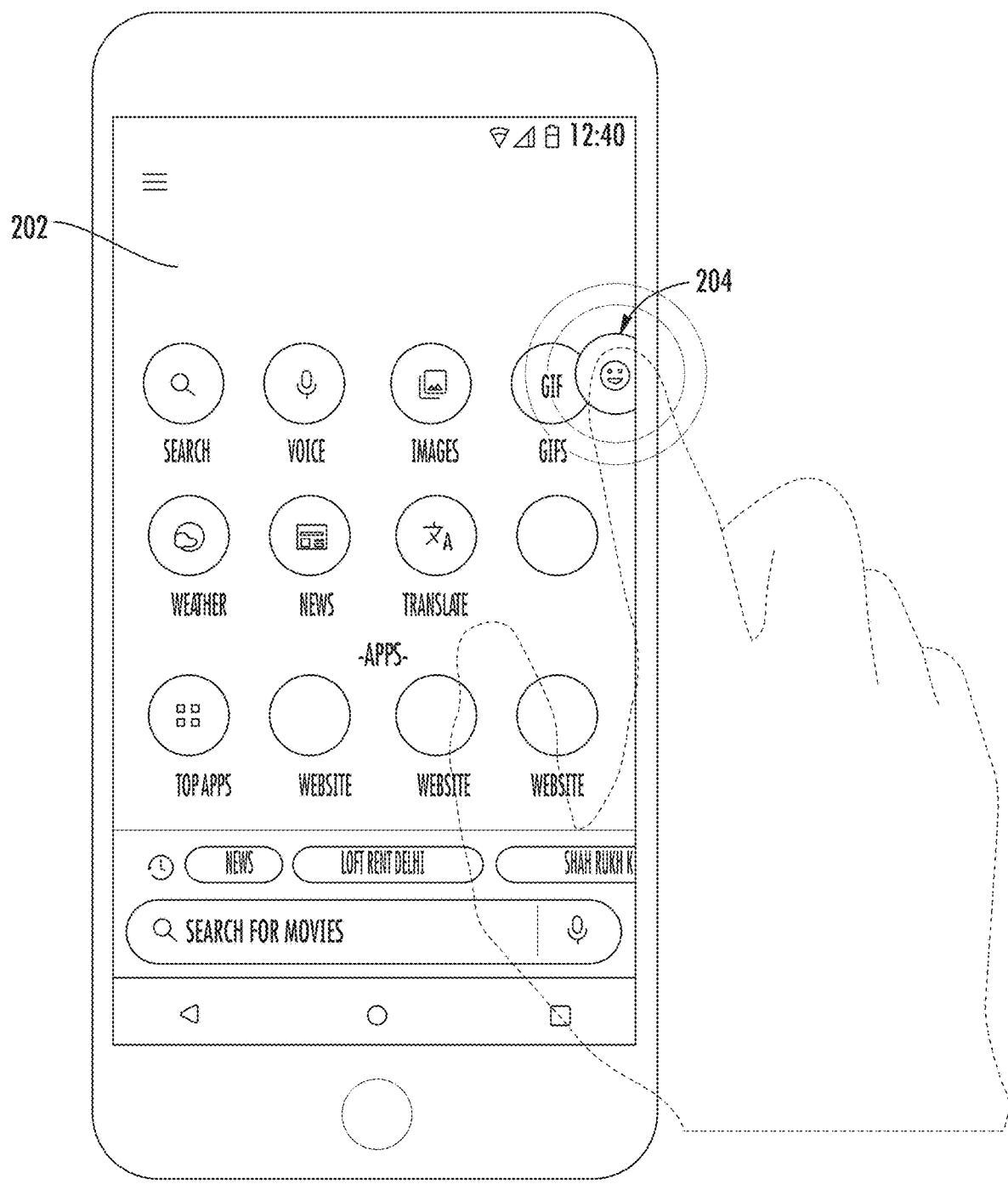
FIG. 5-10 depict an example of a first TTS request according to example embodiments of the present disclosure.
Figure 6:
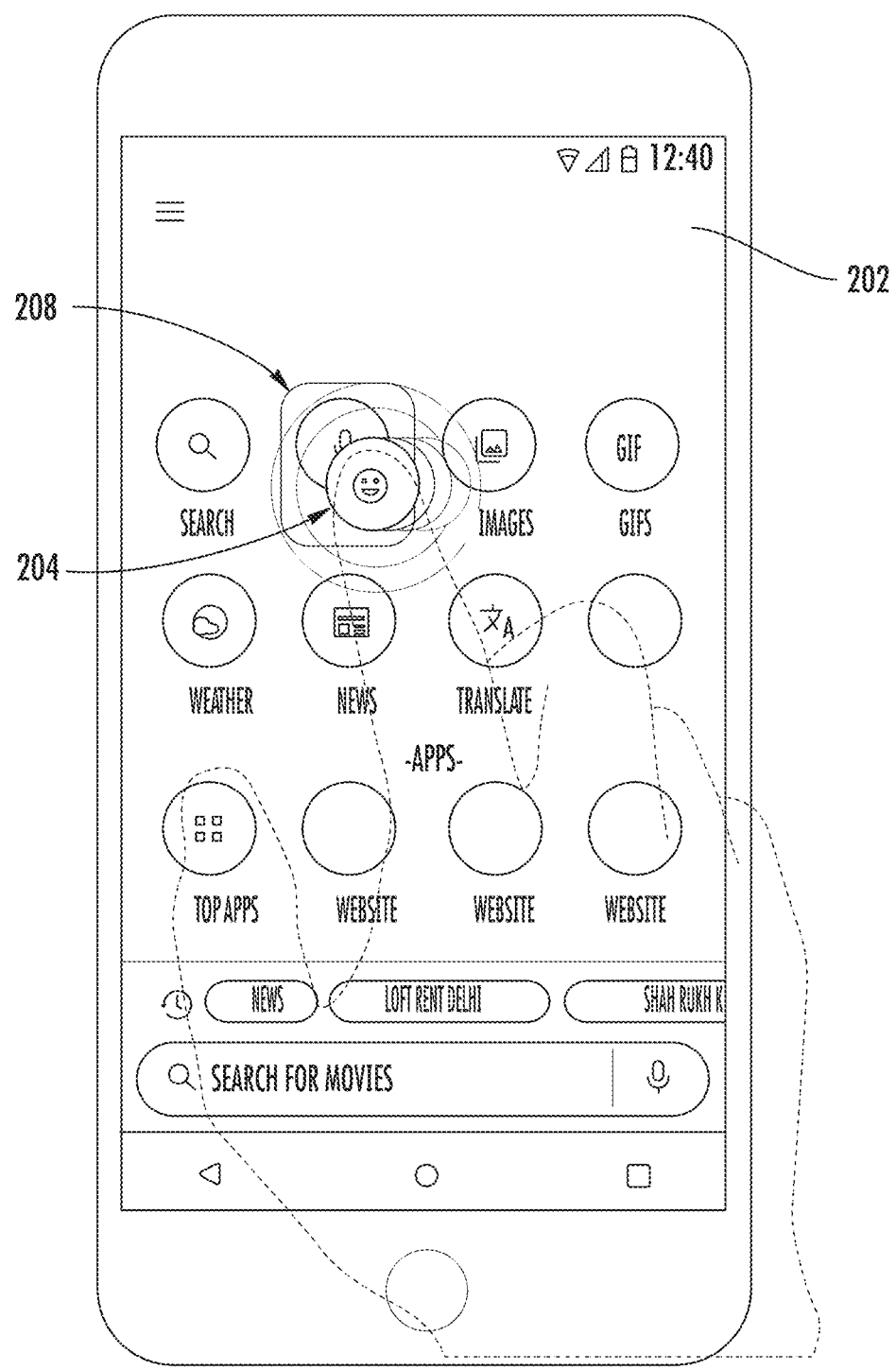

FIG. 5-10 depict an example of a first TTS request according to example embodiments of the present disclosure. As shown in FIG. 5, the user can select TTS selector 204 at the first position and move TTS selector 204 from the first position to another location. As shown in FIG. 6, the user can move TTS selector 204 from the first position to a second position overlaid on first document 202. The second position can be on top of application component 208 of first document 202 that includes an icon and label associated with the "Voice" application. TTS system 116 can analyze one or more structural features associated with first document 202 to determine application component 208, and when TTS selector 204 is at the second position, TTS system 116 can highlight application component 208 to indicate to the user that the text associated with application component 208 can be interpreted and rendered as speech in audio output provided by TTS system 116.

Figure 7:
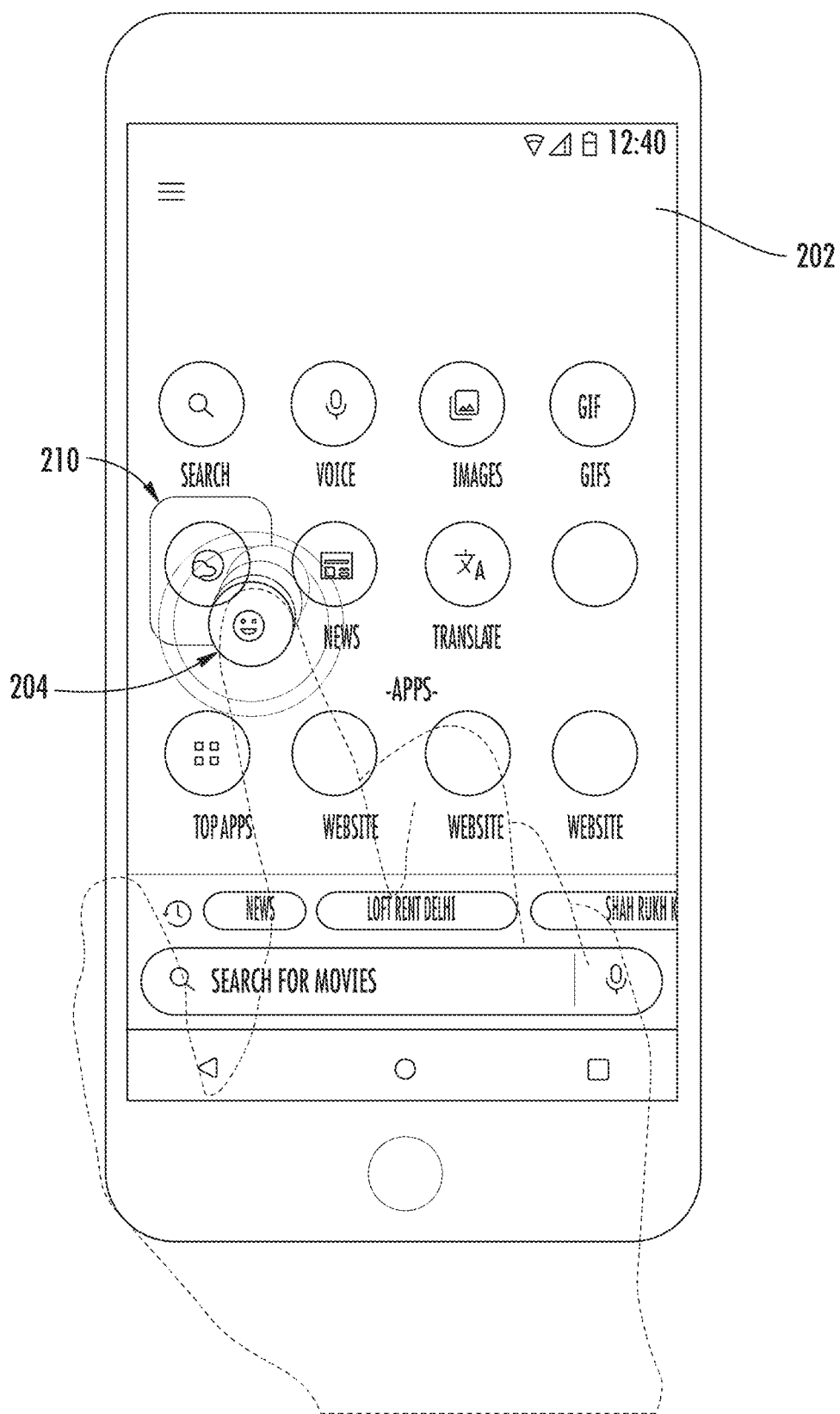
Figure 8:
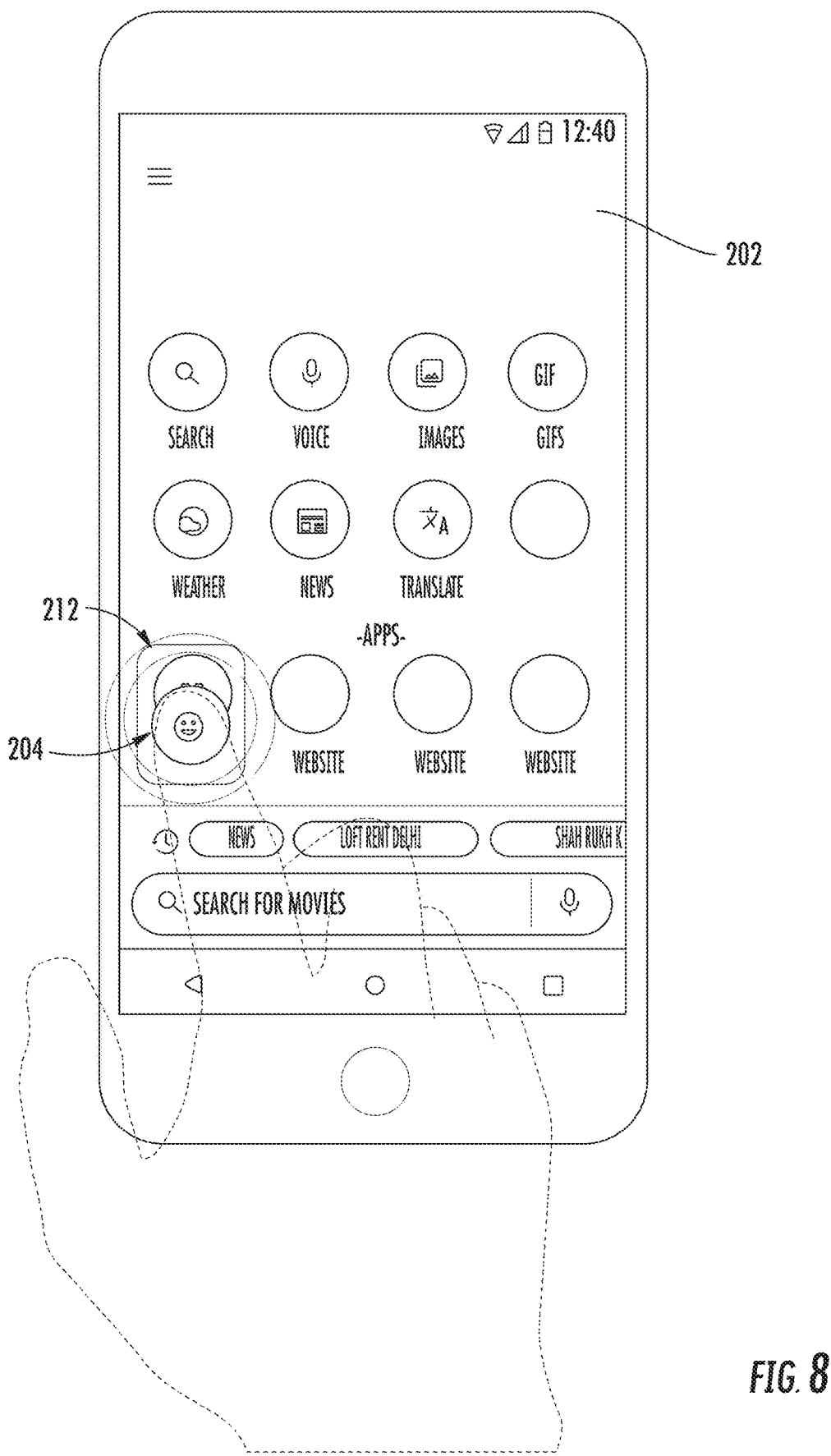

As shown in FIG. 7, the user can move TTS selector 204 from the second position to a third position. The third position can be on top of application component 210 of first document 202 that includes an icon and label associated with the "Weather" application. TTS system 116 can determine application component 210 based on the one or more structural features associated with first document 202. When TTS selector 204 is at the third position, TTS system 116 can highlight application component 210 to indicate to the user that the text associated with application component 210 can be interpreted and rendered as speech in audio output provided by the TTS system 116. As shown in FIG. 8, the user can move TTS selector 204 from the third position to a fourth position. The fourth position can be on top of application component 212 of first document 202 that includes an icon and label associated with the "Top apps" application. TTS system 116 can determine application component 212 based on the one or more structural features associated with first document 202. When TTS selector 204 is at the fourth position, TTS system 116 can highlight application component 212 to indicate to the user that the text associated with application component 212 can be interpreted and rendered as speech in audio output provided by the TTS system 116.

Figure 9:
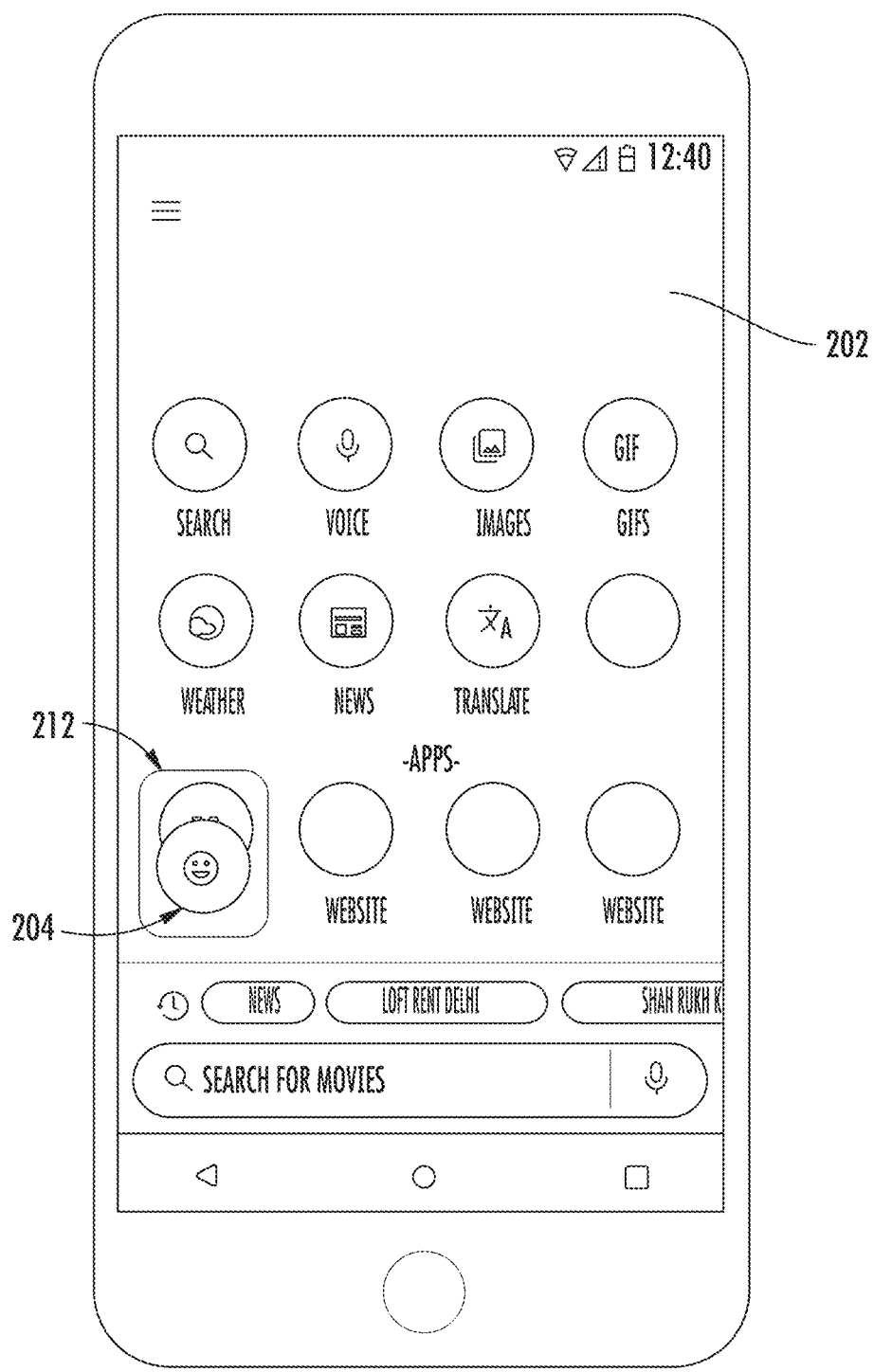

As shown in FIG. 9, the user can release TTS selector 204 at the fourth position (e.g., playback position) to submit the first TTS request. In response to the first TTS request, TTS system 116 can determine first content from first document 202 based on content inside the highlighted area (e.g., selection area) at the playback position. In particular, TTS system 116 can determine the first content as the label "Top apps". TTS system 116 can determine second content based on contextual information associated with the first content (e.g., "the highlighted application reads") and generate speech data based on the first and second content. TTS system 116 can output the generated speech data as audio via speaker(s) 124 (not shown).

In some implementations, TTS system 116 can analyze one or more characteristics associated with the first TTS request to determine movement data indicative of a movement of TTS selector 204 from the first position to the playback position. For example, TTS system 116 can determine movement data indicative of a movement speed of TTS selector 116 from the first position to the playback position, a movement path of TTS selector 116 from the first position to the playback position (e.g., via the second position and third position), and/or a delay between a first time when the TTS selector is moved to the playback position and a second time when the TTS selector is released at the playback position. TTS system 116 can determine the first content and the second content based at least in part on the movement data.

Figure 10:
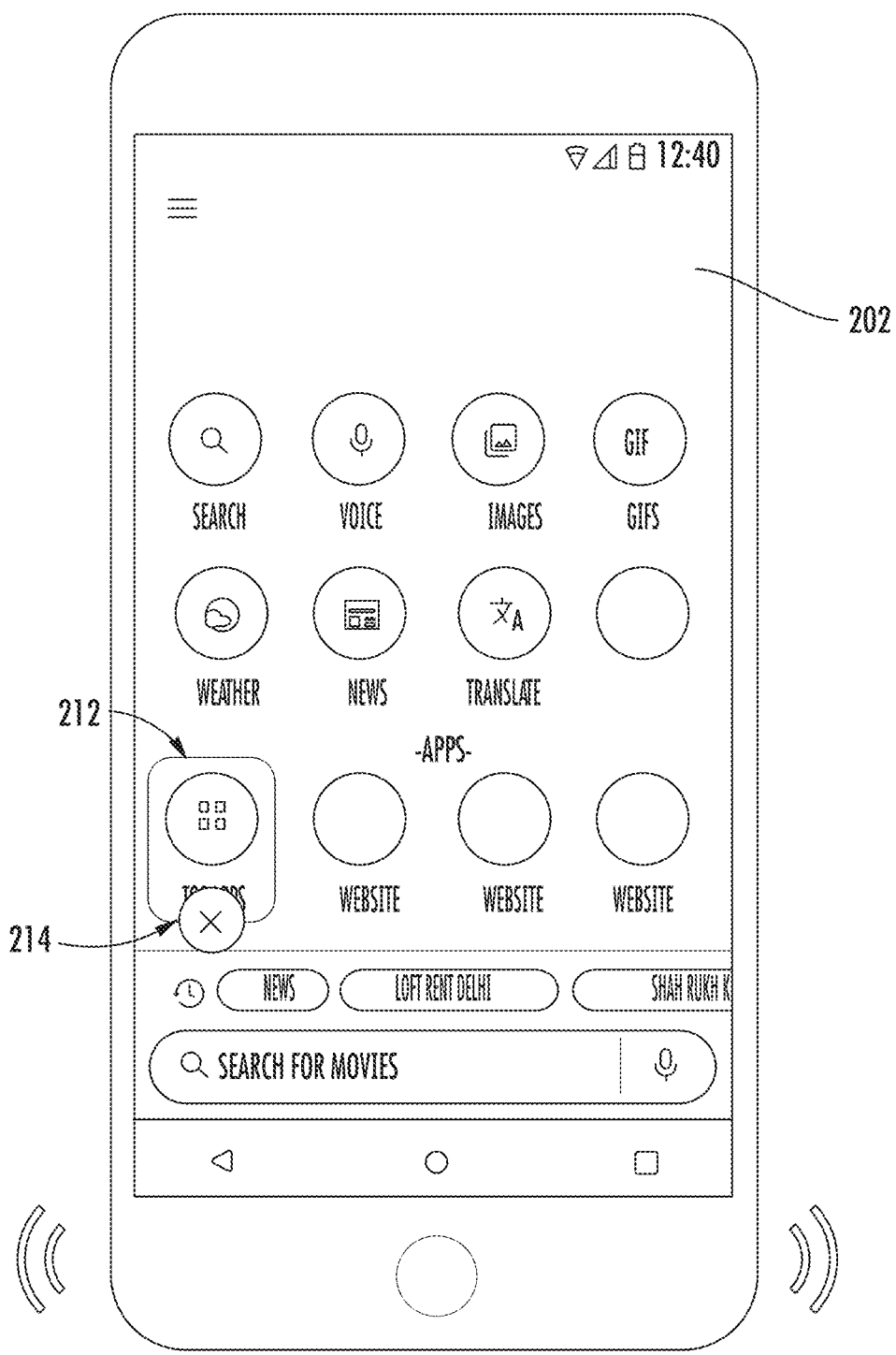

As shown in FIG. 10, during playback of the speech data, TTS system 116 can display TTS controller 214 to provide the user with options to control the playback. TTS controller 214 can be associated with TTS interface 140 of TTS system 116. TTS system 116 can display TTS controller 214 with an "X" icon, and the user can activate TTS controller 214 (e.g., by tapping the "X" icon) to pause or stop playback. When the user activates TTS controller 214 to pause or stop playback, TTS system 116 can display TTS controller 214 with a play icon instead of "X" to provide the user with options to resume playback.

Figure 11:
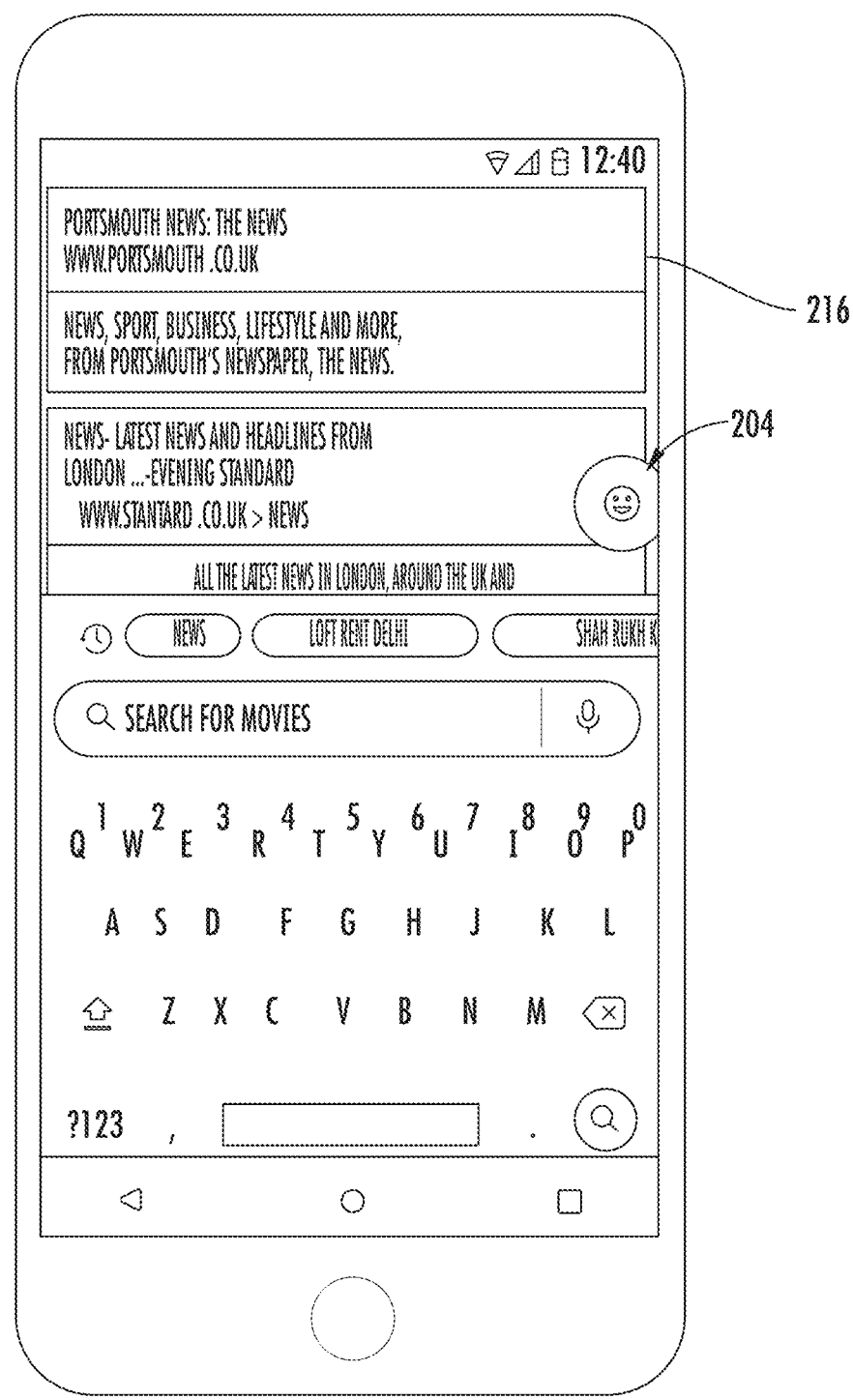
FIG. 11-15 depict an example of a second TTS request according to example embodiments of the present disclosure.
Figure 12:
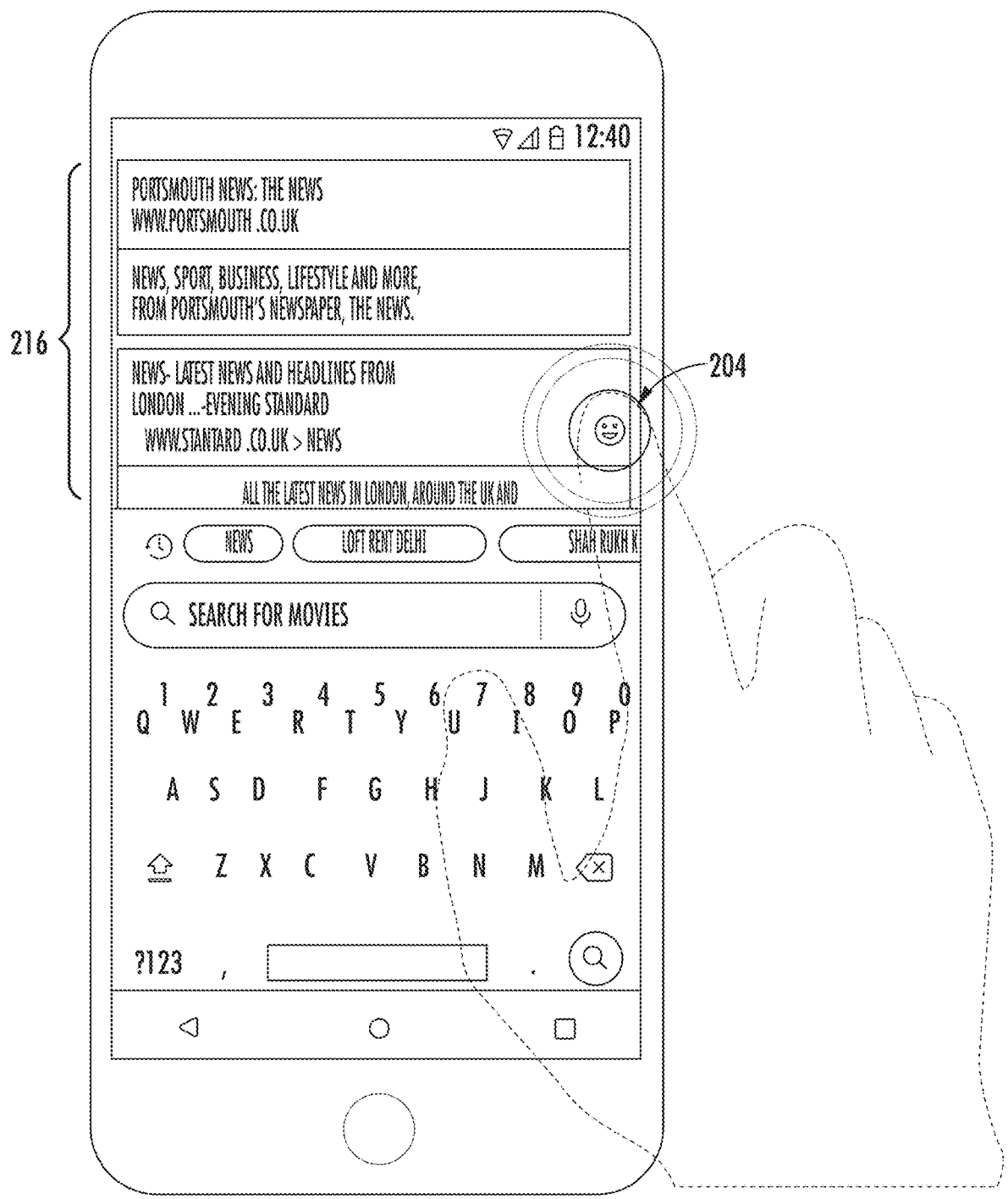
Figure 13:
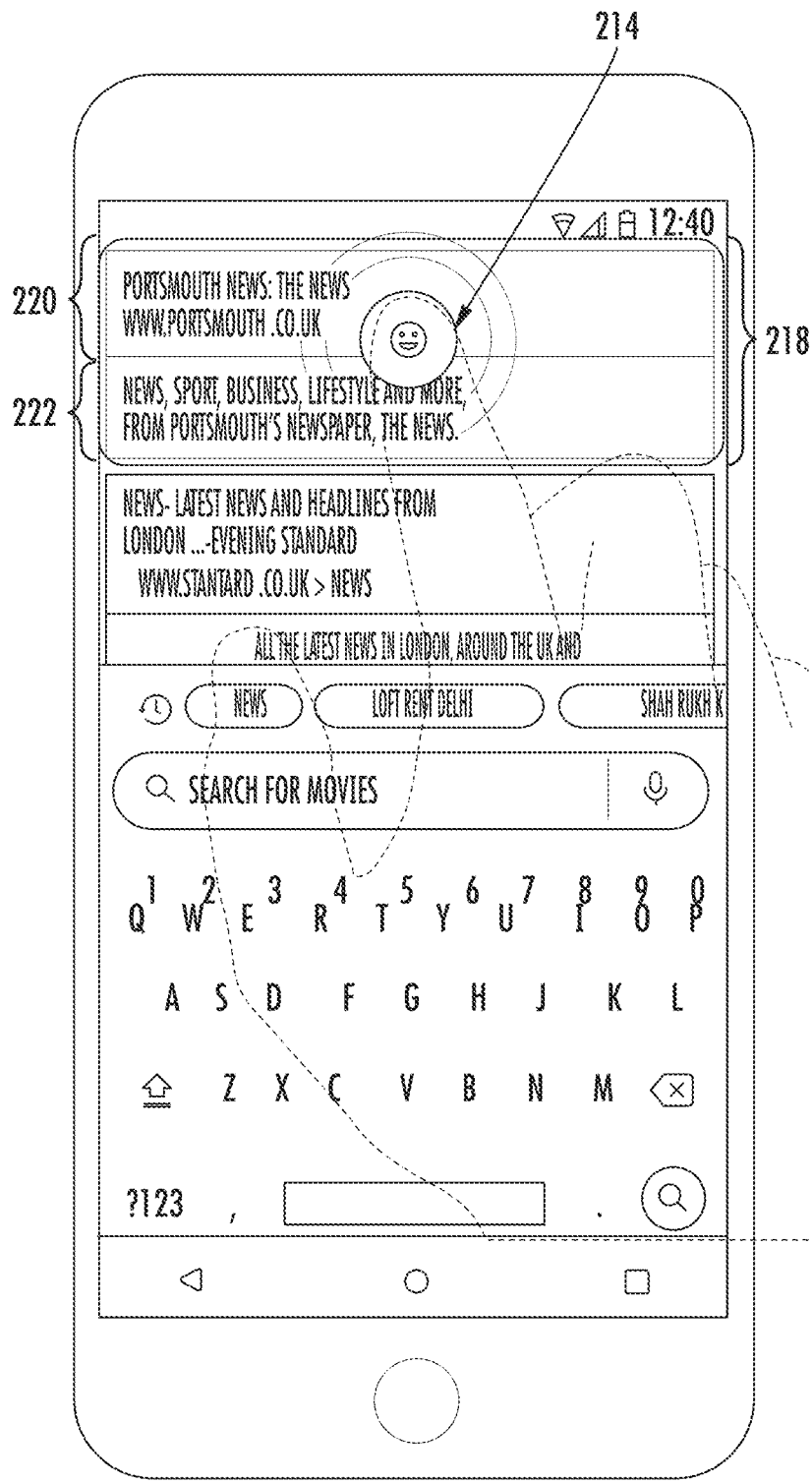

FIG. 11-15 depict an example of a second TTS request according to example embodiments of the present disclosure. As shown in FIG. 11, second document 216 (e.g., search results) can be displayed on display 122. Second document 216 can include additional content that is not displayed on display 122 (e.g., content that is hidden by a virtual keyboard, content that can be accessed by scrolling second document 216, metadata associated with second document 216, etc.). TTS system 116 can display TTS selector 204 at a first position overlaid on top of second document 216. As shown in FIG. 12, the user can select TTS selector 204 at the first position and move TTS selector 204 from the first position to another location. As shown in FIG. 13, the user can move TTS selector 204 from the first position to a second position overlaid on second document 216. The second position can be on top of first search result component 218 of second document 216. TTS system 116 can analyze one or more structural features associated with second document 216 to determine first search result component 218. TTS system 116 can further determine that first search result component 218 includes heading component 220 and excerpt component 222. TTS system 116 can determine that heading component 218 includes textual content such as "Portsmouth News: The News" and a URL, and that except component 222 includes a first sentence component and a second sentence component. TTS system 116 can determine that the first sentence component includes textual content such as "news, sport, businesses, lifestyle and more, from Portsmouth's newspaper" and the second sentence component includes textual content such as "The news . . . ". When TTS selector 204 is on top of first search result component 218, TTS system 116 can highlight first search result component 218 to indicate to the user that the text associated with first search result component 218 can be interpreted and rendered as speech in audio output provided by TTS system 116. The user can release TTS selector 204 at the second positon (e.g., playback position) to submit the second TTS request. In response to the second TTS request, TTS system 116 can determine first content from second document 216 as content inside the highlighted area (e.g. selection area) at the playback position, and determine second content based on the first content. TTS system 116 can generate speech data based on the first and second content, and output the generated speech data as audio via speaker(s) 124 (not shown).

Figure 14:
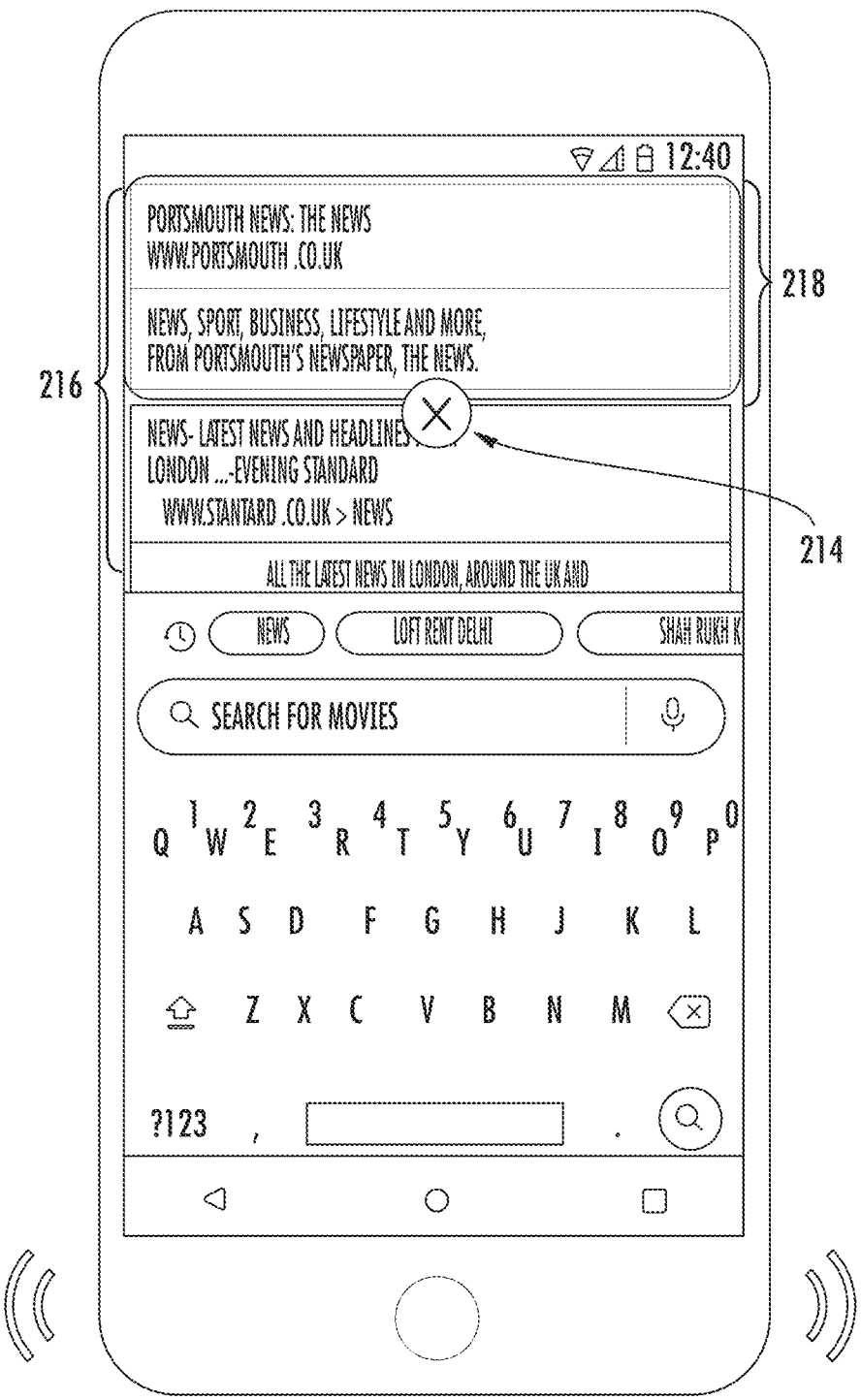

As shown in FIG. 14, during playback of the speech data, TTS system 116 can display TTS controller 214 to provide the user with options to control the playback. TTS system 116 can display TTS controller 214 with an "X" icon, and the user can activate TTS controller 214 (e.g., by tapping the "X" icon) to pause or stop playback. When the user activates TTS controller 214 to pause or stop playback, TTS system 116 can display TTS controller 214 with a play icon instead of "X" to provide the user with options to resume playback.

Figure 15:
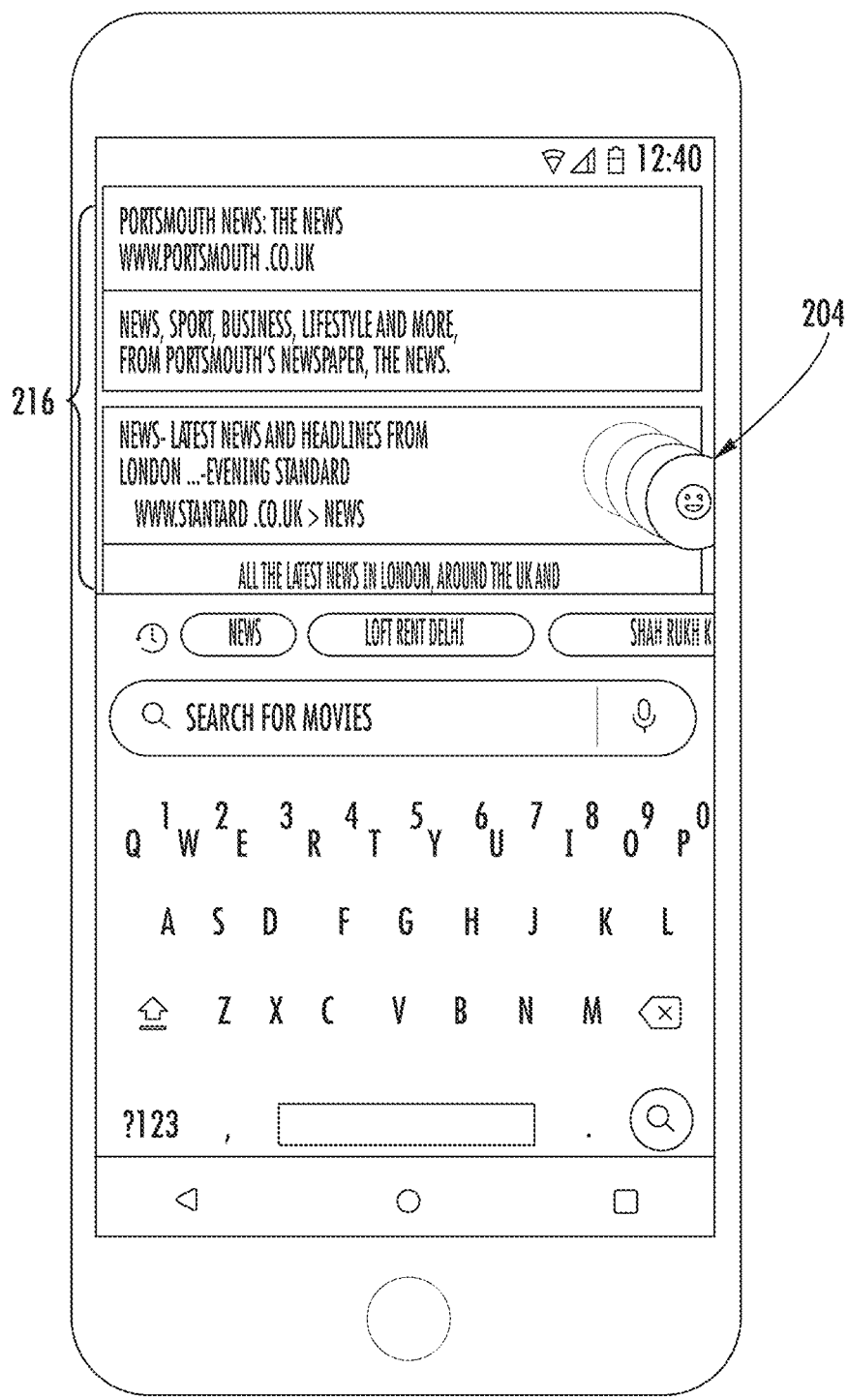

As shown in FIG. 15, when TTS system 116 completes playback of the speech data, or if the user interrupts playback of the speech data via TTS controller 214, then TTS system 116 can display TTS selector 204 returning from the second position to the first position to indicate that TTS system 116 is ready to receive another TTS request from the user.

Figure 16:
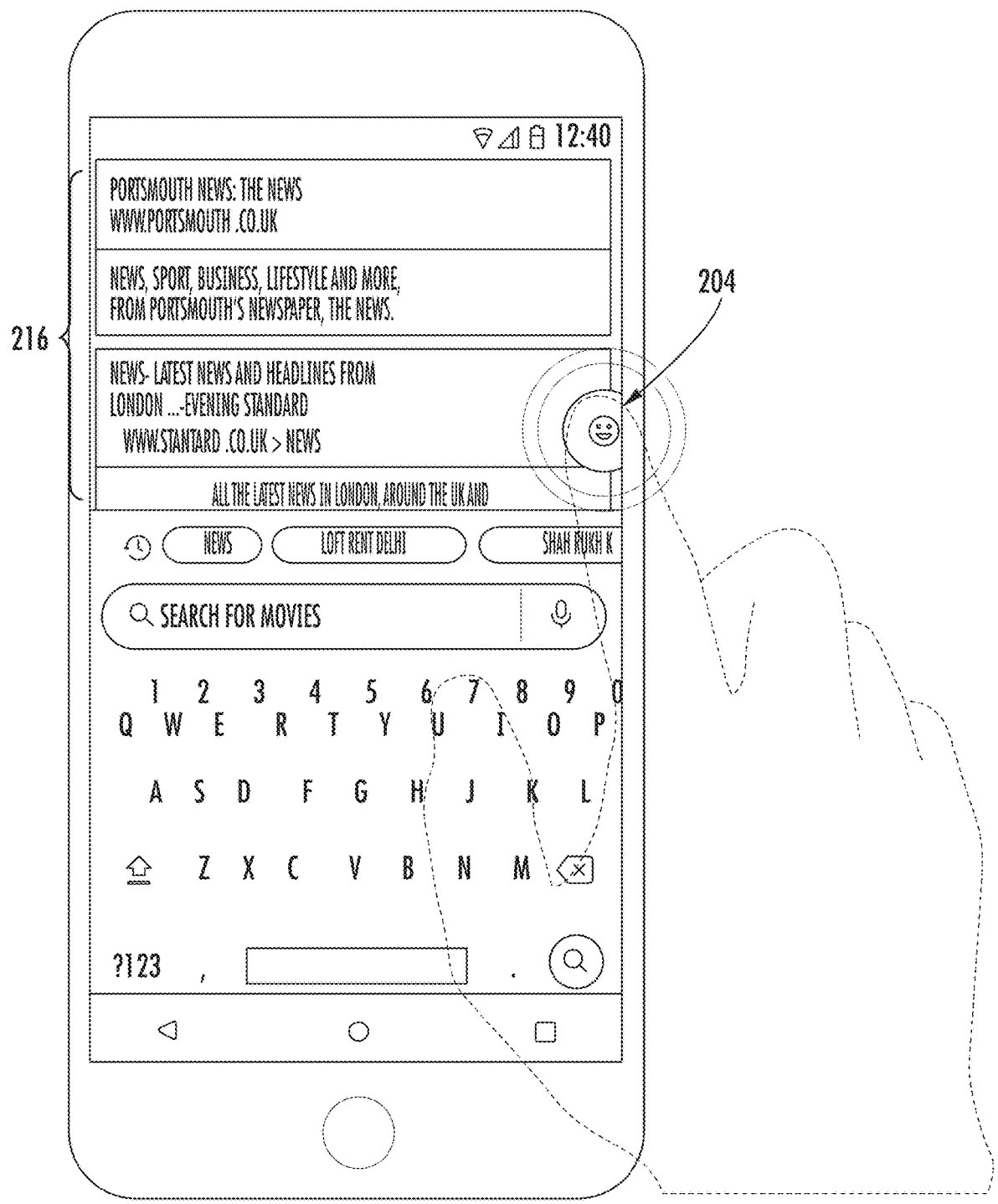
FIG. 16-18 depict an example of an invalid TTS request according to example embodiments of the present disclosure.
Figure 17:
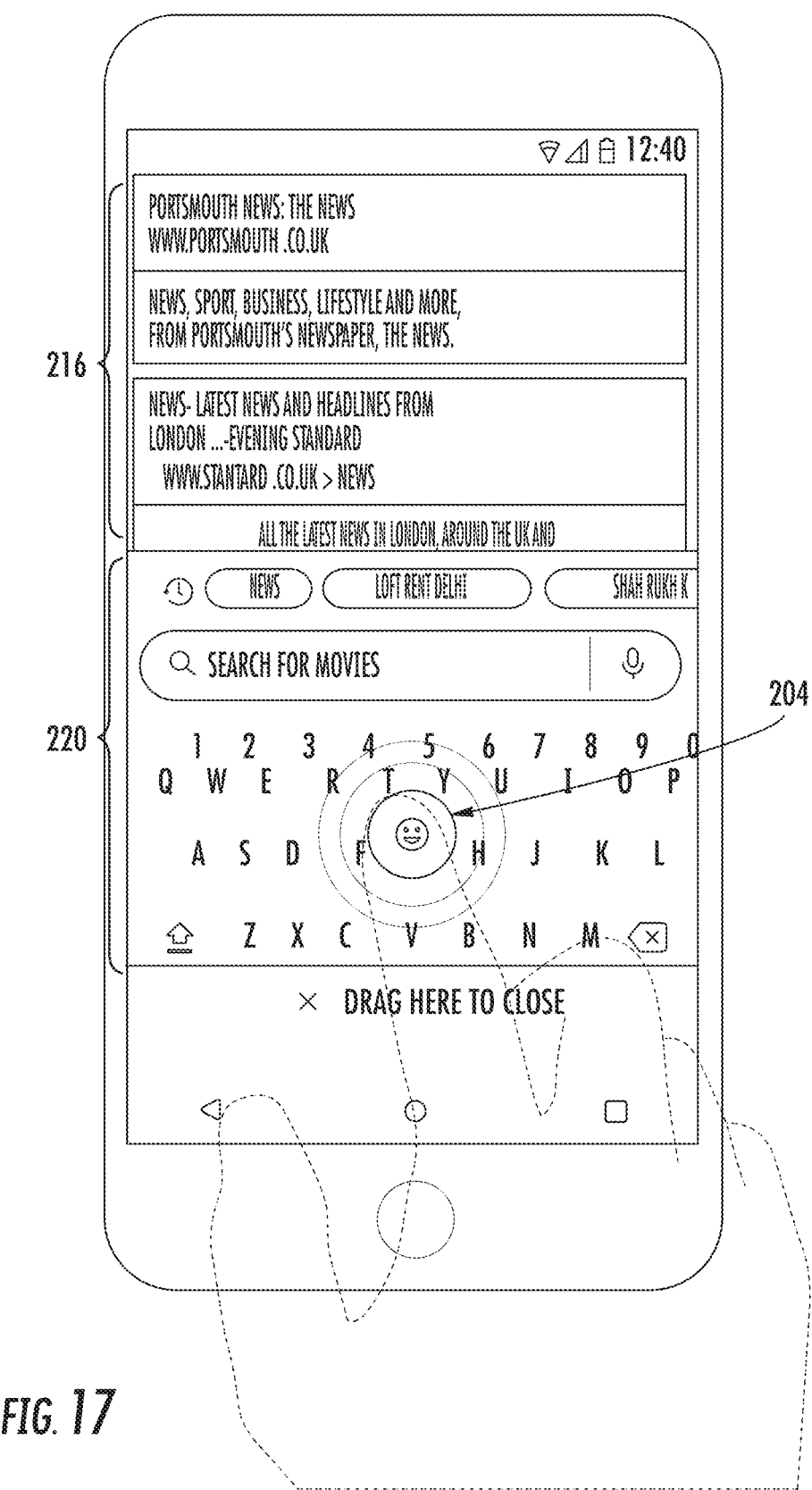
Figure 18:
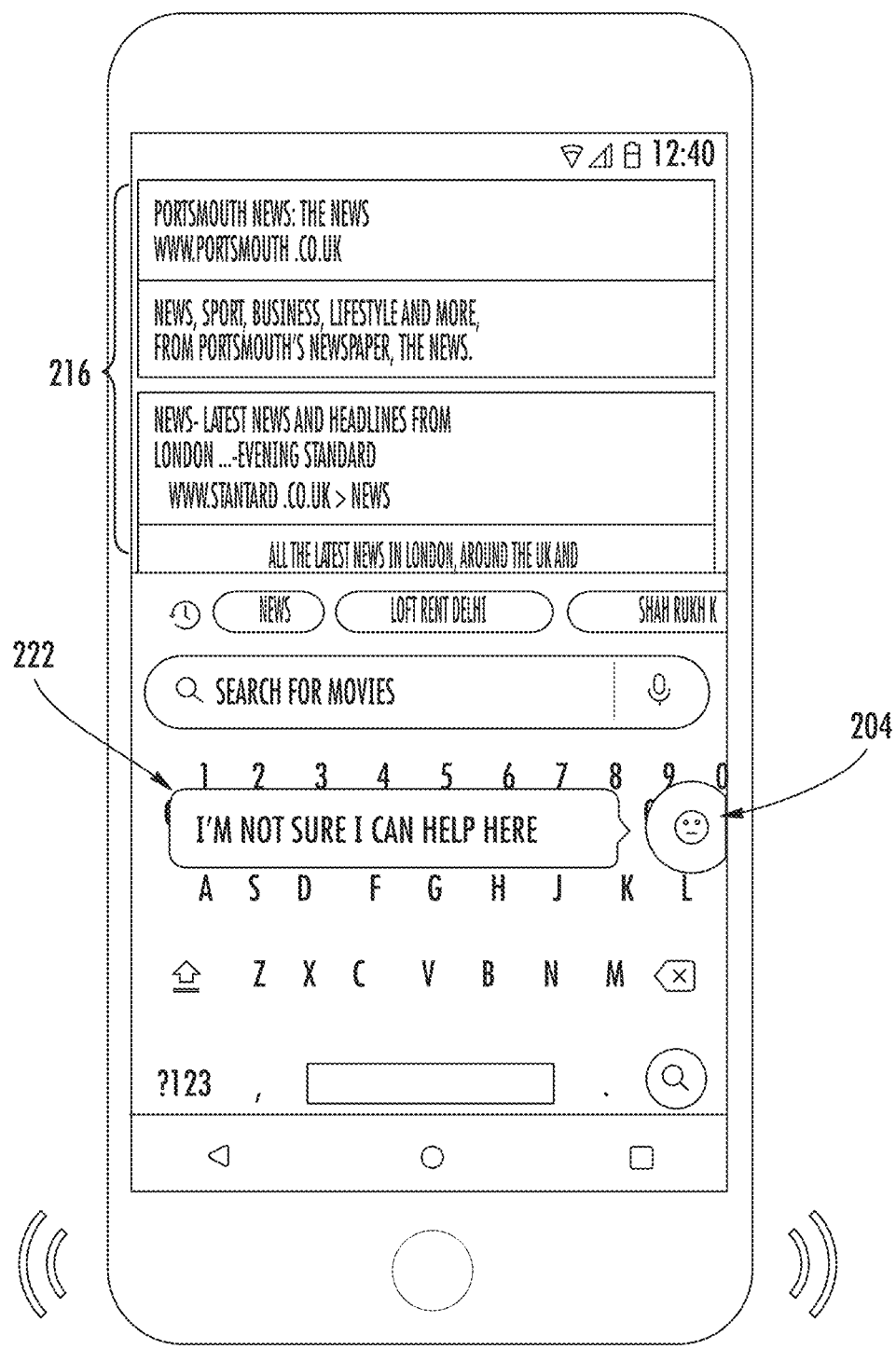

FIG. 16-18 depict an example of an invalid TTS request according to example embodiments of the present disclosure. As shown in FIG. 16, the user can select TTS selector 204 at a first position overlaid on second document 216 and move TTS selector 204 from the first position to another location. As shown in FIG. 17, the user can move TTS selector 204 from the first position to a second position overlaid on virtual keyboard 220. When TTS selector 204 is at the second position, TTS system 116 can determine that content within a selection area at the second position is not recognized. As shown in FIG. 18, the user can release TTS selector 204 at the second position, and in response TTS system 116 can playback an explanatory or educational message 222 such as "I'm not sure I can help here" to indicate to the user that TTS system 116 cannot playback content at the second position.

Figure 19:
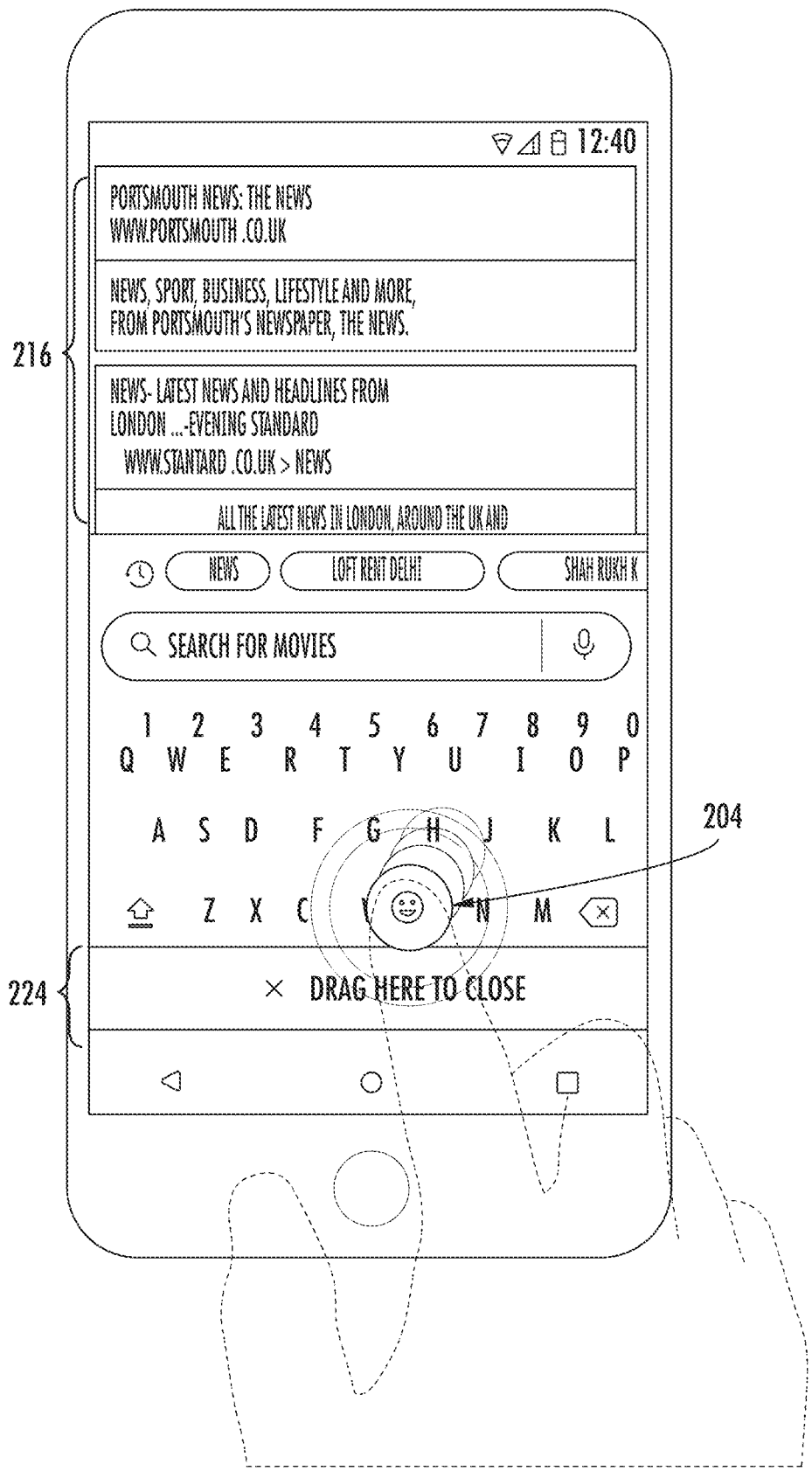
FIG. 19-20 depict an example of deactivating a TTS system according to example embodiments of the present disclosure.
Figure 20:
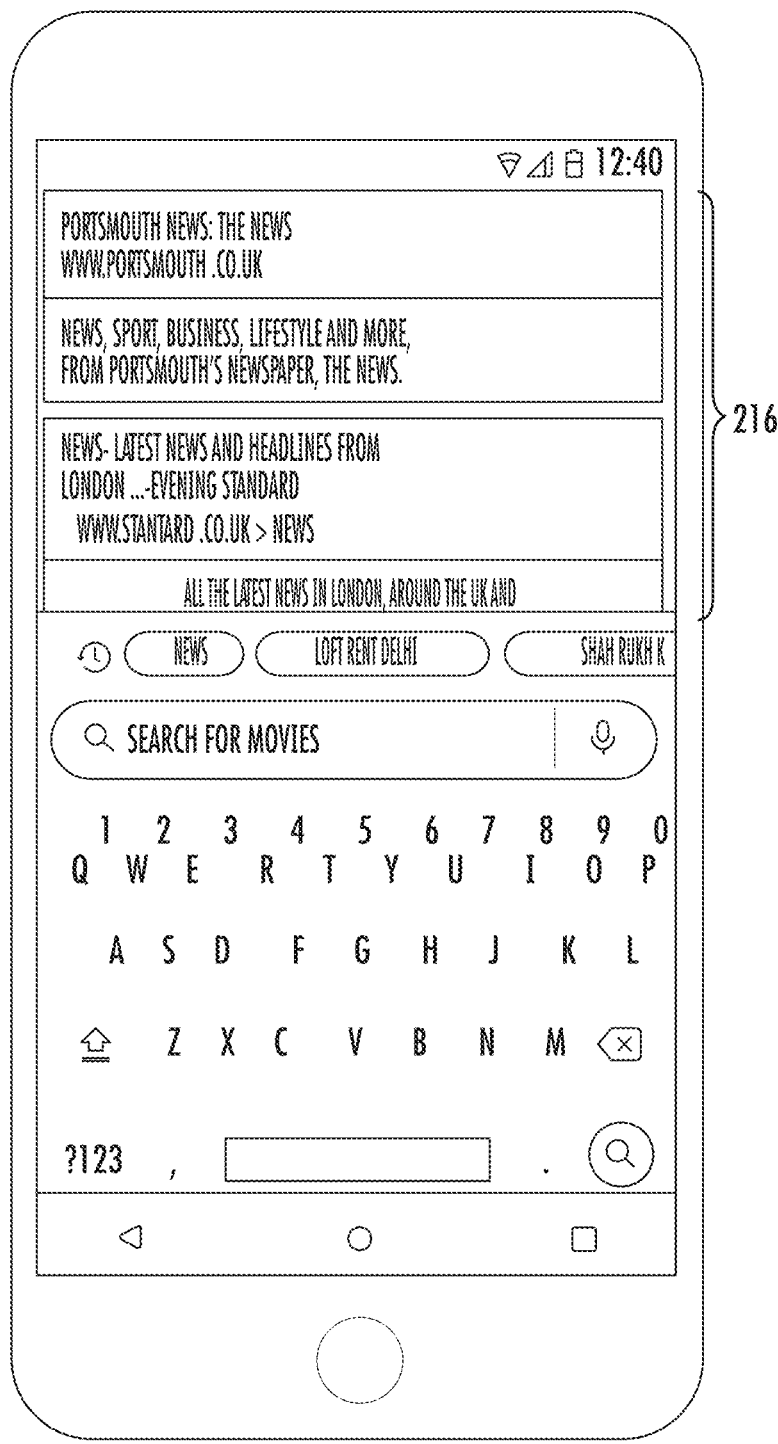

FIG. 19-20 depict an example of deactivating a TTS system according to example embodiments of the present disclosure. As shown in FIG. 19, the user can move TTS selector 204 toward location 224 (e.g., near the bottom of display 122). TTS system 116 can display a message (e.g., "Drag here to close") at location 224 to indicate to the user that releasing TTS selector 204 at location 224 will deactivate TTS system 116. As shown in FIG. 20, when the user releases TTS selector 204 at location 224, TTS system 116 can be deactivated and TTS selector 204 is no longer displayed as an overlay on second document 216.

Figure 21:
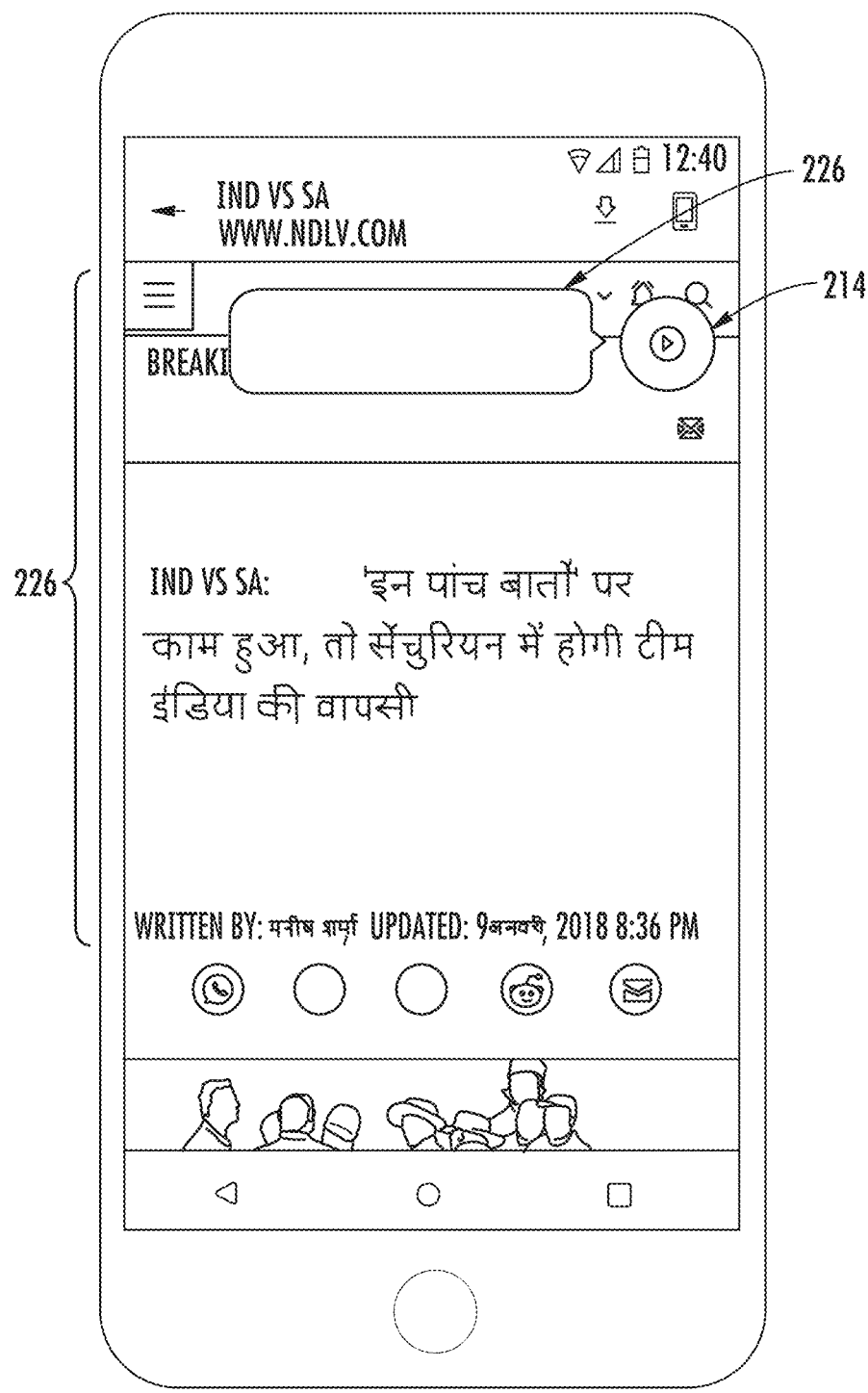
FIG. 21 depicts an example of content playback in response to a TTS request according to example embodiments of the present disclosure.

FIG. 21 depicts an example of content playback in response to a TTS request according to example embodiments of the present disclosure. As shown in FIG. 21, TTS system 116 can display TTS controller 214 (shown as a play icon) to provide the user with an indication that playback of speech data has commenced. TTS system 116 can generate the speech data based on first and second content from third document 228. In some implementations, TTS system 116 can display an excerpt 226 of the first and second content associated with a portion of the content being output as audio.

Figure 22:
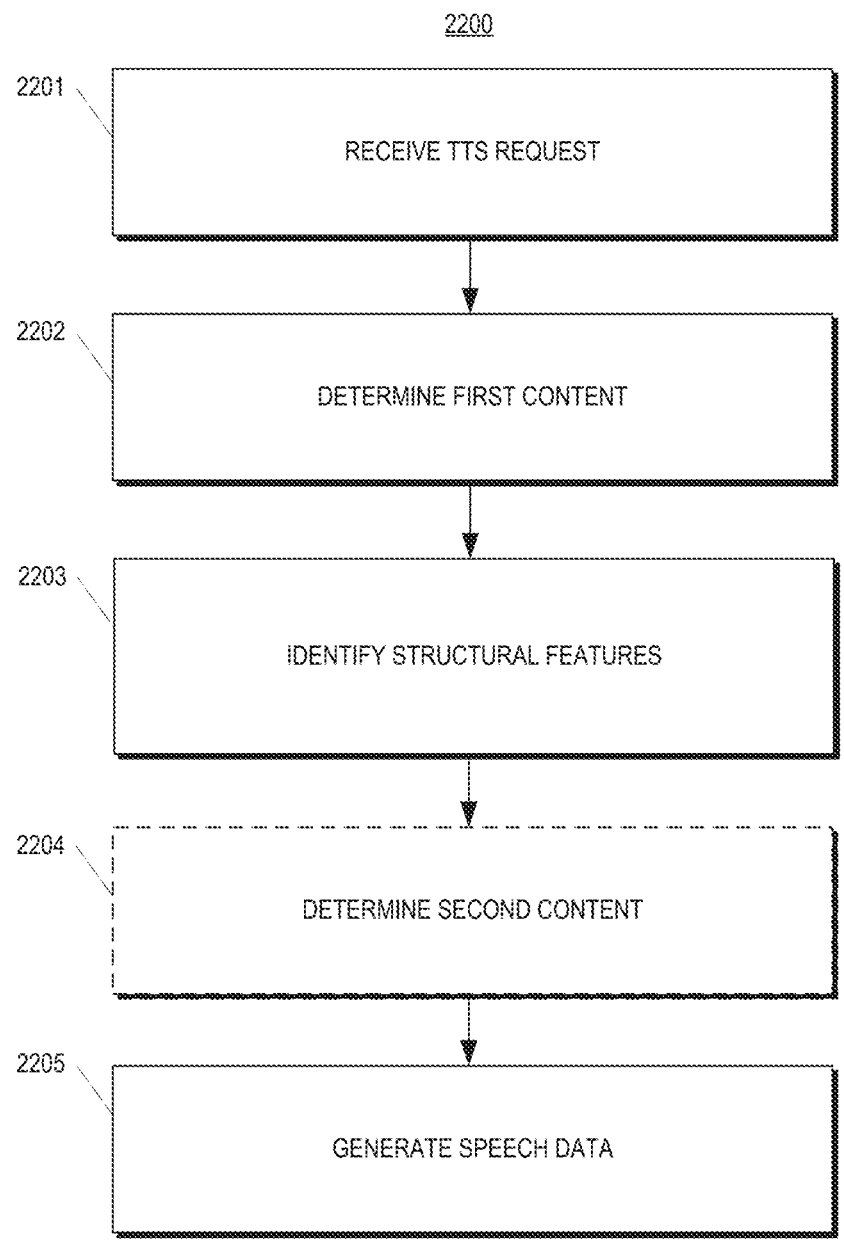
FIG. 22 depicts an example flow diagram for selecting content to be read aloud according to example embodiments of the present disclosure.

FIG. 22 depicts a flow diagram of a method 2200 for selecting content to be read aloud according to example embodiments of the present disclosure. At (2201), the method 2200 can include receiving a TTS request. For example, TTS system 116 can receive a TTS request associated with a first document. TTS system 116 can receive the TTS request from a user of computing system 102. The TTS request can include data associated with a playback position of a TTS selector associated with TTS interface 140 displaying the first document.

At (2202), the method 2200 can include determining first content. For example, TTS system 116 can determine first content associated with the first document based at least in part on the playback position of the TTS selector. The first content can include content that is displayed in the TTS interface 140 at the playback position. The TTS selector can be associated with a selection area centered on the playback position of the TTS selector. TTS system 116 can determine the first content as content associated with the first document that is displayed at least in part within the selection area at the playback position.

At (2203), the method 2200 can include identifying structural features associated with the first document. In some examples, the one or more structural features are associated with the first content. For example, TTS system 116 can analyze the first document to identify one or more structural features associated with the first content. The one or more structural features associated with the first content can include, for example, a component of an organizational hierarchy of the first document that is associated with the first content. In some implementations, TTS system 116 can analyze one or more contents associated with the first content to identify the one or more structural features associated with the first content. In some implementations, the first document is a webpage, and the TTS system 116 can analyze at least one of HTML data or CSS data associated with the webpage to identify the one or more structural features associated with the first content. In some examples, the TTS system 116 may identify structural features associated with the first document and utilize the structural features in determining the first content based on the TTS request.

At (2204), the method 2200 can include determining second content. For example, TTS system 116 can determine second content associated with the first document based at least in part on the one or more structural features associated with the first content. In some implementations, TTS system 116 can determine one or more semantic attributes associated with the first content and determine the second content based at least in part on a semantic relationship between the second content and the first content. In some implementations, TTS system 116 can determine second content such that at least a portion of the second content is not displayed on the display 122. In some implementations, TTS system 116 can determine second content such that the first content and second content are non-contiguous (e.g., the first content and second content are associated with a first component and a second component of the first document, the first and second components being non-contiguous components in the organizational hierarchy of the first document). In some implementations, the first content can include a sentence and the second content can include a different sentence. In some implementations, the first content can include a paragraph and the second content can include one or more sentences from a different paragraph.

At (2205), the method 2200 can include generating speech data. For example, TTS system 116 can determine speech data based on the first content and second content. TTS system 116 can playback the speech data for the user via the one or more speakers 124. In some implementations, determining the second content at (2204) can be optional, and at (2205), the method 2200 can include generating speech data based on the first content and the one or more structural features associated with the first content.

Figure 23:
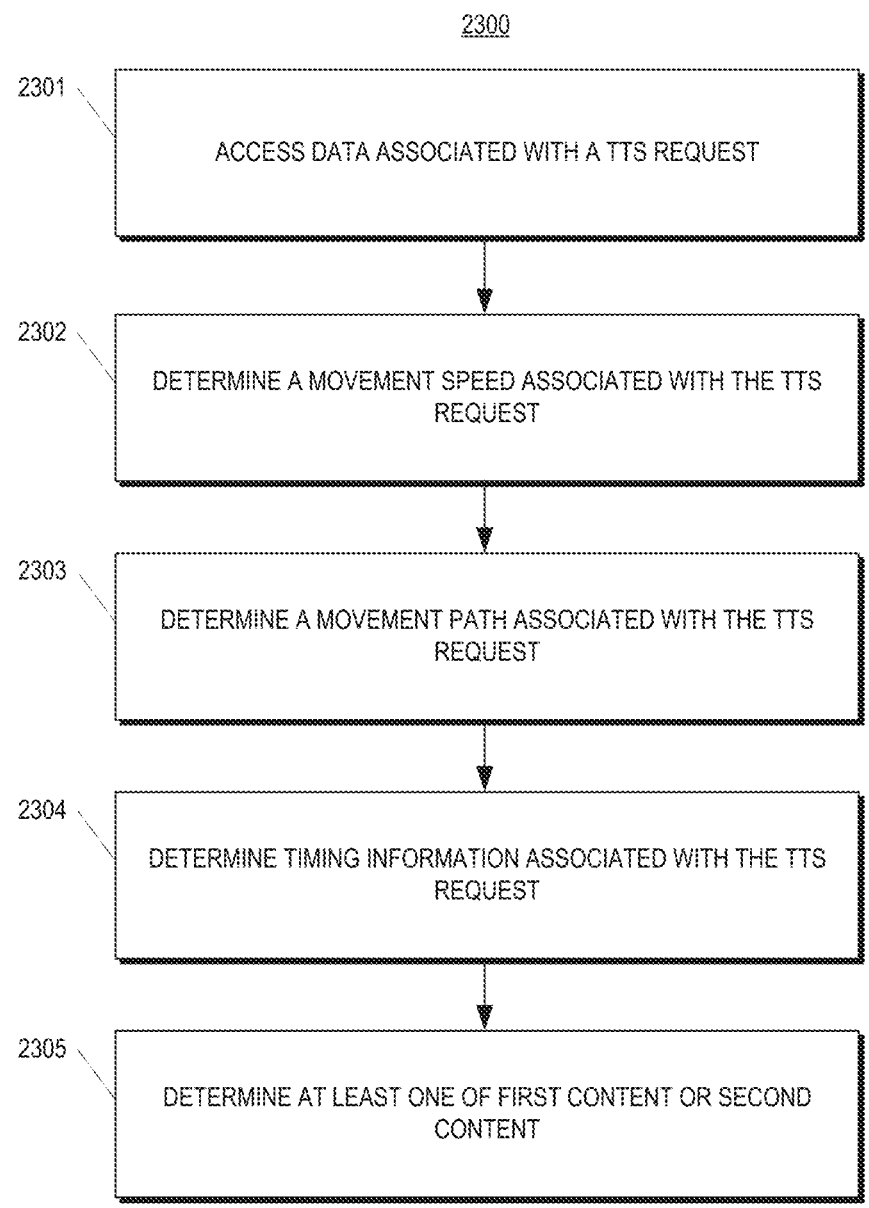
FIG. 23 depicts an example flow diagram for determining at least one of first content or second content according to example embodiments of the present disclosure.

FIG. 23 depicts a flow diagram of a method 2300 for determining at least one of first content or second content. At (2301), the method 2300 can include accessing data associated with a TTS request. For example, TTS system 116 can access TTS request data 134. TTS request data 134 can include data associated with a current TTS request. TTS system 116 can analyze one or more characteristics associated with the current TTS request to determine movement data indicative of a movement of the TTS selector from a first position in the TTS interface 140 to the playback position.

At (2302), the method 2300 can include determining a movement speed associated with the TTS request. For example, TTS system 116 can determine a movement speed of the TTS selector from the first position to the playback position. If the movement speed is above a first threshold speed and below a second threshold speed, then TTS system 116 can associate a default selection area with the TTS selector. If the movement speed is below the first threshold speed, then TTS system 116 can associate a reduced selection area with the TTS selector. If the movement speed is above the second threshold speed, then TTS system 116 can associate an expanded selection area with the TTS selector.

At (2303), the method 2300 can include determining a movement path associated with the TTS request. For example, TTS system 116 can determine a movement path of the TTS selector from the first position to the playback position. TTS system 116 can determine a direct path from the first position to the playback position, and a deviation of the determined movement path from the direct path. If the deviation of the movement path is below a first threshold deviation, then TTS system 116 can associate a default selection area with the TTS selector. If the deviation of the movement path is above the first threshold deviation, then TTS system 116 can associate an expanded selection area with the TTS selector.

At (2304), the method 2300 can include determining timing information associated with the TTS request. For example, TTS system 116 can determine a first time when the TTS selector is moved from the first position to the playback position, and a second time when the TTS selector is released at the playback position. TTS system 116 can determine a delay between the first time and the second time. If the delay is below a first threshold delay, then TTS system 116 can associate a default selection area with the TTS selector. If the delay is above the first threshold delay, then TTS system 116 can associate a reduced selection area with the TTS selector.

At (2305), the method 2300 can include determining at least one of first content or second content based on the movement speed, movement path, and/or timing information. For example, in some implementations, TTS system 116 can determine the first content based on content that is displayed at least in part inside the selection area (e.g., default selection area, expanded selection area, or reduced selection area) at the playback position of the TTS selector. If the selection area at the playback position of the TTS selector includes content associated with a first component of the first document, then TTS system 116 can determine the first content based on a portion of the content associated with the first component that is displayed inside the selection area at the playback position. If the selection area at the playback position of the TTS selector includes content associated with two or more components of the first document, then TTS system 116 can determine a first component from the two or more components that occupies a greater portion of the selection area and determine the first content based on content associated with the first component (e.g., a portion of the content associated with the first component that is displayed inside the selection area).

In some implementations, TTS system 116 can determine the second content based on the selection area (e.g., default selection area, expanded selection area, or reduced selection area) at the playback position of the TTS selector. If the selection area at the playback position of the TTS selector includes content associated with a first component of the first document, and at least a portion of the content associated with the first component is displayed outside the selection area, then TTS system 116 can determine the second content based on the portion of the content associated with the first component that is displayed outside the selection area. If the selection area at the playback position of the TTS selector includes content associated with two or more components of the first document, then TTS system 116 can determine a first component from the two or more components that occupies a greater portion of the selection area and determine the second content based on content associated with the first component that is displayed outside the selection area. Alternatively, TTS system 116 can determine a second component from the two or more components that occupies a lesser portion of the selection area and determine the second content based on content associated with the second component that is displayed inside the selection area.

Figure 24:
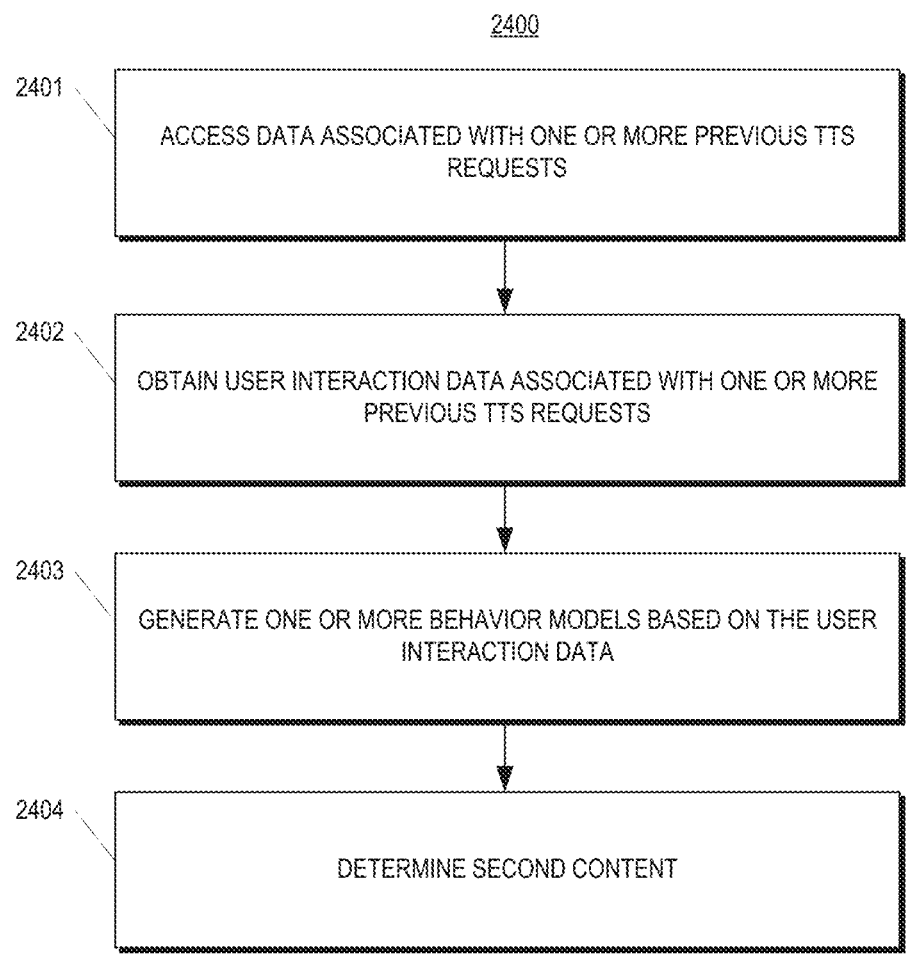
FIG. 24 depicts an example flow diagram for determining second content according to example embodiments of the present disclosure.

FIG. 24 depicts a flow diagram of a method 2400 for determining second content. At (2401) the method 2400 can include accessing data associated with one or more previous TTS requests. For example, TTS system 116 can access TTS request data 134. TTS request data 134 can include data associated with one or more previous TTS requests. In particular, TTS request data 134 can include data indicative of a first content and a second content that was determined for each of the one or more previous TTS requests.

At (2402) the method 2400 can include obtaining user interaction data associated with the one or more previous TTS requests. For example, TTS system 116 can access user interaction data 136. User interaction data 136 can include data indicative of one or more interactions between the user and the first document. In particular, user interaction data 135 can include data indicative of the one or more interactions in response to playback of speech data based on a previous TTS request from the user that is associated with the first document. If the previous TTS request is associated with a first component of the first document, and the user scrolls to a second component of the first document in response to playback of speech data based on first and second content associated with the first component, then TTS system 116 can determine that the determination of the second content was sufficient to facilitate understanding of the first content for the user. Alternatively, if the user's attention remains focused on the first component of the first document, then TTS system 116 can determine that the determination of the second content was insufficient to facilitate understanding of the first content for the user.

At (2403) the method 2400 can include generating one or more behavior models based on the user interaction data associated with the one or more previous TTS requests. For example, based on the one or more user interactions in response to the one or more previous TTS requests, TTS system 116 can determine whether the determined second content associated with each of the previous TTS requests is sufficient or insufficient to facilitate understanding of the first content associated with each of the previous TTS requests. TTS system 116 can use the sufficient/insufficient determination as ground truth data, and TTS system 116 can train one or more machine-learned models with the ground truth data to generate the one or more behavior models. The one or more behavior models can be configured to receive an input including a document (e.g., first document) and first content associated with the document (e.g., first content determined in response to a TTS request associated with the first document), and output a predicted second content that can facilitate understanding of the first content for the user.

At (2404) the method 2400 can include responding to one or more TTS requests based on the one or more previous TTS requests, one or more interactions in response to the one or more previous TTS requests, and/or the one or more behavior models. For example, second content can be determined based the one or more previous TTS requests, one or more interactions in response to the one or more previous TTS requests, and/or one or more behavior models. It is noted that the operations in FIG. 24 are not necessarily sequential and/or temporally-related. Additionally, the operations may be distributed across multiple computing systems. For example, a set of previous TTS requests can be accessed by a remote computing device, the user interaction data obtained, and the behavior model(s) generated at a first time. Later, a behavior model can be deployed at a client device and used at a second unrelated time to respond to TTS requests as they are received. In another example, a client device may generate a behavior model and respond to TTS requests. In some instances the operations may be sequential and/or related. For example, a first TTS request associated with a document may be used to determine how to respond to a second TTS request received in close temporal relation to the first TTS request. It is further noted that in some examples that not all of the operations in FIG. 24 are performed. For example, a previous TTS request can be used to respond to a current TTS request without obtaining interaction data or generating and/or using a behavior model. Similarly, user interaction data may be used without previous TTS request data or a behavior model, or a behavior model may be used without previous TTS request data or user interaction data.

For example, in some implementations, if TTS system 116 determines, based on the one or more previous TTS requests, that a previous TTS request is associated with first content and that a current TTS request is associated with the same first content, then TTS system 116 can determine that the user is having difficulty understanding the first content, and TTS system 116 can determine second content associated with the current TTS requests that can further assist the user in understanding the first content (e.g., determine second content associated with the current TTS request that is different than second content associated with the previous TTS request).

In some implementations, if TTS system 116 determines, based on the one or more interactions in response to the one or more previous TTS requests, that a previous TTS request is sufficient, and that the previous TTS request and a current TTS request are associated with a same first content, then TTS system 116 can determine that the user would like to repeat playback of speech data associated with the previous TTS request. TTS system 116 can determine second content associated with the current TTS request that is the same as second content associated with the previous TTS request, and generate speech data based on the first and second content for playback to the user. Alternatively, if the TTS system 116 determines, based on the one or more interactions in response to the one or more previous TTS requests, that a previous TTS request is insufficient, and that the previous TTS request and a current TTS request are associated with a same first content, then TTS system 116 can determine that the user is having difficulty understanding the first content, and TTS system 116 can determine second content associated with the current TTS requests that can further assist the user in understanding the first content (e.g., determine second content associated with the current TTS request that is different than second content associated with the previous TTS request).

In some implementations, TTS system 116 can determine the first content associated with the first document based on a current TTS request associated with the first document. TTS system 116 can input the first document and the first content into a behavior model associated with the user to obtain a predicted second content as an output of the behavior model.

As an example, if the selection area at the playback position of the TTS selector includes content associated with a first component of the first document, then TTS system 116 determines the first content based on a portion of the content associated with the first component that is displayed inside the selection area at the playback position. TTS system 116 can input the first document and the first content into a behavior model associated with the user to obtain a predicted second content as an output of the behavior model. The predicted second content can include a portion of the content associated with the first component that is displayed outside the selection area. For example, if the first content includes a first portion of a sentence, then the predicted second content can include a second portion of the sentence (e.g., at least a portion of the sentence that is displayed outside the selection area at the playback position), or an automatically generated summary of the second portion of the sentence. If the first content includes a first portion of a paragraph, then the predicted second content can include a second portion of the paragraph (e.g., at least a portion of the paragraph that is displayed outside the selection area at the playback position), or an automatically generated summary of the second portion of the paragraph.

According to example embodiments, one or more machine-learned models can be used to assist a user in understanding a selected passage by identifying second content to be rendered as speech by the TTS system. For example, at least a portion of a sentence preceding a selected sentence may be identified as second content that can be rendered as speech in an audio signal prior to rendering the selected sentence as first content. As another example, at least a portion of a paragraph preceding a selected paragraph may be identified as second content that can be rendered as speech in an audio signal prior to rendering the selected paragraph as first content. As yet another example, a user may drop the TTS selector partway through a paragraph. The TTS system can identify one or more preceding sentences or a summary of the preceding sentence(s) as second content to be rendered as speech prior to rendering the selected portion of the paragraph. Such a technique can provide full context to a user.

In some implementations, the one or more machine-learned models can be generated based on a user's interaction with multiple documents. For example, TTS request data 134 can include data indicative of one or more TTS requests associated with a first document and a second document, over one or more sessions, and user interaction data 136 can include data indicative of a user's previous interactions in relation to the first document and second document, over one or more sessions. TTS request data 134 and user interaction data 136 can be used to generate one or more machine-learned models that are used to assist the user in understanding a third document.

In some implementations, the one or more machine-learned models can be generated based on multiple users' interaction with a single document. For example, TTS request data 134 can include data indicative of one or more TTS request associated with a first document from multiple users, over one or more sessions, and user interaction data 136 can include data indicative of multiple users' previous interactions in relation to the first document, over one or more sessions. TTS request data 134 and user interaction data 136 can be used to generate one or more machine-learned models that are used to assist a user in understanding the first document.

In some implementations, the one or more machine-learned models can be generated based on multiple users' interaction with multiple documents. For example, TTS request data 134 can include data indicative of one or more TTS request associated with a first document and a second document from multiple users, over one or more sessions, and user interaction data 136 can include data indicative of multiple users' previous interactions in relation to the first document and second document, over one or more sessions. TTS request data 134 and user interaction data 136 can be used to generate one or more machine-learned models that are used to assist a user in understanding the first document, second document, or a third document.

The technology discussed herein makes reference to servers, databases, software applications, and/or other computer-based systems, as well as actions taken and information sent to and/or from such systems. The inherent flexibility of computer-based systems allows for a great variety of possible configurations, combinations, and/or divisions of tasks and/or functionality between and/or among components. For instance, processes discussed herein can be implemented using a single device or component and/or multiple devices or components working in combination. Databases and/or applications can be implemented on a single system and/or distributed across multiple systems. Distributed components can operate sequentially and/or in parallel.

Various connections between elements are discussed in the above description. These connections are general and, unless specified otherwise, can be direct and/or indirect, wired and/or wireless. In this respect, the specification is not intended to be limiting.

The depicted and/or described steps are merely illustrative and can be omitted, combined, and/or performed in an order other than that depicted and/or described; the numbering of depicted steps is merely for ease of reference and does not imply any particular ordering is necessary or preferred. The functions and/or steps described herein can be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors in a computer and/or other data-processing device. The computer-executable instructions can be stored on a computer-readable medium such as a hard disk, optical disk, removable storage media, solid-state memory, read-only memory (RAM), or the like. As will be appreciated, the functionality of such instructions can be combined and/or distributed as desired. In addition, the functionality can be embodied in whole or in part in firmware and/or hardware equivalents, such as integrated circuits, application-specific integrated circuits (ASICs), field programmable gate arrays (FPGAs), or the like. Particular data structures can be used to more effectively implement one or more aspects of the disclosure, and such data structures are contemplated to be within the scope of computer-executable instructions and/or computer-usable data described herein.

Although not required, one of ordinary skill in the art will appreciate that various aspects described herein can be embodied as a method, system, apparatus, and/or one or more computer-readable media storing computer-executable instructions. Accordingly, aspects can take the form of an entirely hardware embodiment, an entirely software embodiment, an entirely firmware embodiment, and/or an embodiment combining software, hardware, and/or firmware aspects in any combination.

As described herein, the various methods and acts can be operative across one or more computing devices and/or networks. The functionality can be distributed in any manner or can be located in a single computing device (e.g., server, client computer, user device, or the like).

Aspects of the disclosure have been described in terms of illustrative embodiments thereof. Numerous other embodiments, modifications, and/or variations within the scope of the appended claims can occur to persons of ordinary skill in the art from a review of this disclosure. For example, one or ordinary skill in the art can appreciate that the steps depicted and/or described can be performed in other than the recited order and/or that one or more illustrated steps can be optional and/or combined. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

Further to the descriptions above, a user may be provided with controls allowing the user to make an election as to both if and when systems, applications or features described herein may enable collection of user information (e.g., a user's previous TTS requests, a user's previous behavior (e.g., one or more previous interactions), or behavior model(s) associated with a user), and if a TTS service is provided to the user based on the user information. In addition, certain data may be treated in one or more ways before it is stored or used, so that personally identifiable information is removed. For example, a user's identity may be treated so that no personally identifiable information can be determined for the user. Thus, the user may have control over what information is collected about the user, how that information is used, and what information is provided to the user.

What is claimed is:

1. A computer-implemented method for content to be read aloud for a vision-impaired user, the method comprising:
   obtaining, by a computing system comprising one or more processors, a gesture input, wherein the gesture input comprises a gesture that moves a selector to a playback position;
   generating, by the computing system, a text-to-speech request associated with a web page based on the gesture input, the request including data associated with the playback position of the selector associated with a text-to-speech interface overlaid on the web page;
   processing, by the computing system, the web page to identify a plurality of structural features associated with the web page;
   determining, by the computing system, first content associated with the web page based at least in part on the playback position and one or more structural features of the plurality of structural features associated with the web page, the first content including content that is displayed at the playback position; and
   generating, by the computing system, speech data based on the first content.

2. The method of claim 1, wherein generating speech data based on the first content comprises:
   generating, by the computing system, audio data based on text of the first content.

3. The method of claim 2, wherein generating speech data based on the first content comprises:
   translating, by the computing system, the first content into a different language.

4. The method of claim 1, wherein the gesture comprises moving the selector from a docked position to the playback position.

5. The method of claim 1, further comprising:
   determining, by the computing system, second content associated with the web page based at least in part on a subset of the plurality of structural features associated with the web page,
   wherein generating the speech data comprises generating the speech data based on the first content and the second content.

6. The method of claim 5, wherein at least a portion of the second content is not displayed on the display.

7. The method of claim 5, wherein the first content and the second content are non-contiguous, such that the first content and the second content are separated by one or more structural features identified when analyzing the web page.

8. The method of claim 1, further comprising:
   determining, by the computing system, the first content of the web page comprises text that the computing system is able to process and render as speech data;
   determining, by the computing system, that the selector is over the first content during the gesture input; and
   displaying, by the computing system, the first content as highlighted.

9. The method of claim 1, wherein processing, by the computing system, the web page to identify the plurality of structural features associated with the web page comprises determining an organizational hierarchy associated with the web page.

10. The method of claim 1, wherein processing, by the computing system, the web page to identify the plurality of structural features associated with the web page comprises processing hyper-text markup language data associated with the web page.

11. A computing system comprising:
   one or more processors; and
   one or more non-transitory computer-readable media that collectively store instructions that, when executed by the one or more processors, cause the computing system to perform operations, the operations comprising:
      obtaining a gesture input, wherein the gesture input comprises a drag and drop gesture that moves a selector to a playback position;
      generating a text-to-speech request associated with a web page based on the gesture input, the request including data associated with the playback position of the selector associated with a text-to-speech interface overlaid on the web page;
      processing the web page to identify a plurality of structural features associated with the web page;
      determining first content associated with the web page based at least in part on the playback position and one or more structural features of the plurality of structural features associated with the web page, the first content including content that is displayed in a user interface at the playback position; and
      generating speech data based on the first content.

12. The system of claim 11, wherein the operations further comprise:
   in response to generating speech data, providing a text-to-speech interface, wherein the text-to-speech interface comprises a plurality of options to control playback of the speech data.

13. The system of claim 11, wherein the operations further comprise:
   determining second content associated with the web page based at least in part on the plurality of structural features associated with the web page;

wherein generating the speech data comprises generating the speech data based on the first content and the second content.

14. The system of claim 13, wherein the operations further comprise:
processing the gesture input to determine movement data indicative of the gesture that moved the selector to the playback position; and
determining at least one of the first content or the second content based at least in part on the movement data.

15. The system of claim 14, wherein the movement data includes at least one of:
a movement speed of the selector from a first position to the playback position;
a movement path of the selector from the first position to the playback position; or
a delay between a first time when the selector is moved to the playback position and a second time when the selector is released at the playback position.

16. The system of claim 11, wherein the operations further comprise:
determining an illustration associated with the speech data; and
providing the speech data and the illustration.

17. One or more non-transitory computer-readable media that collectively store instructions that when executed by one or more processors cause the one or more processors to perform operations, the operations comprising:
obtaining a gesture input, wherein the gesture input comprises a gesture that moves a selector to a playback position;
generating a text-to-speech request associated with a web page based on the gesture input, the request including data associated with the playback position of the selector associated with a text-to-speech interface overlaid on the web page;
processing the web page to identify a plurality of structural features associated with the web page;
determining first content associated with the web page based at least in part on the playback position and one or more structural features of the plurality of structural features associated with the web page, the first content including content that is displayed in a user interface at the playback position; and
generating speech data based on the first content.

18. The one or more non-transitory computer-readable media of claim 17, wherein generating the text-to-speech request associated with the web page comprises:
determining the playback position based on positioning of the selector.

19. The one or more non-transitory computer-readable media of claim 17, wherein the operations further comprise:
receiving an input to open a text-to-speech interface; and
providing the text-to-speech interface, wherein the text-to-speech interface comprises the selector.

20. The one or more non-transitory computer-readable media of claim 17, wherein the operations further comprise:
providing the speech data for playback.

* * * * *